United States Patent [19]
Takahashi

[11] Patent Number: 5,878,020
[45] Date of Patent: Mar. 2, 1999

[54] INFORMATION RECORDING DISK WITH MANAGEMENT AREAS

[75] Inventor: Hideki Takahashi, Nagareyama, Japan

[73] Assignee: Kabushiki Kaisha Toshiba, Kawasaki, Japan

[21] Appl. No.: 826,401

[22] Filed: Mar. 24, 1997

[30] Foreign Application Priority Data

Mar. 25, 1996 [JP] Japan ..................................... 8-068410

[51] Int. Cl.$^6$ ................................. G11B 7/24; G11B 7/00
[52] U.S. Cl. ............................ 369/275.3; 369/54; 369/58
[58] Field of Search .................................. 369/275.3, 58, 369/32, 48, 53–54, 47, 60, 49, 124, 44.26, 44.28, 50

[56] References Cited

U.S. PATENT DOCUMENTS 5,475,668  12/1995  Azumatani et al. ....................... 369/58
5,596,564  1/1997   Fukushima et al. .................. 369/275.3

*Primary Examiner*—Ali Neyzari
*Attorney, Agent, or Firm*—Cushman Darby & Cushman IP Group of Pillsbury Madison & Sutro LLP

[57] ABSTRACT

A disk rotated at one of prescribed rotation speeds so as to record information is used. The disk includes a data area formed spirally or concentrically with a center of rotation, in which information is recorded when the disk is being rotated at the rotation speed, and a management area in which management information associated with writing is recorded at the rotation speed when writing is to be performed in the data area during rotation of the disk at the rotation speed. The management area is formed spirally or concentrically with the center of rotation of the disk on a side farther from the center of rotation of the disk.

14 Claims, 26 Drawing Sheets

| RECORD MAP (1) (REPLACEMENT/ MANAGEMENT AREA = INNER) | RECORD MAP (2) (REPLACEMENT/ MANAGEMENT AREA = OUTER) | TRACK NUMBER | ROTATION SPEED (rpm) |
|---|---|---|---|
| REP./MAN. AREA MA1 | | #001 #002 | N1 |
| DATA AREA DA1 | DATA AREA DA1 | ⋮ #098 | |
| | REP./MAN. AREA MA1 | #099 #100 | |
| REP./MAN. AREA MA2 | | #101 #102 | N2 |
| DATA AREA DA2 | DATA AREA DA2 | ⋮ #198 | |
| | REP./MAN. AREA MA2 | #199 #200 | |
| REP./MAN. AREA MA3 | | #201 #202 | N3 |
| DATA AREA DA3 | DATA AREA DA3 | ⋮ #298 | |
| | REP./MAN. AREA MA3 | #299 #300 | |
| REP./MAN. AREA MA4 | | #301 #302 | N4 |
| DATA AREA DA4 | DATA AREA DA4 | ⋮ #398 | |
| | REP./MAN. AREA MA4 | #399 #400 | |

FIG. 8

RELATIVE SECTOR NUMBER

| | |
|---|---|
| 0 | PHYSICAL FORMAT INFO. |
| 1 | DISK MANUFACTUREING INFO. |
| 2<br>·<br>·<br>15 | CONTENTS PROVIDER INFO. |

CONTROL DATA ZONE SHALL CONTAIN EMBOSSED DATA FIELDS.

DATA FIELDS SHALL CONTAIN EMBOSSED DATA OF CONTROL DATA.

CONTROL DATA IS COMPRISED OF 192 ECC BLOCKS STARTING FROM SECTOR NUMBER 193024 (2F200h) IN LEAD-IN AREA.

THE CONTENT OF 16 SECTORS IN EACH BLOCK SHOWN IN FIG. 14 IS REPEATED 192 TIMES.

FIG. 14

| BYTE POS. | CONTENTS | NO. OF BYTES |
|---|---|---|
| 0 | BOOK TYPE & PART VERSION | 1 |
| 1 | DISK SIZE & MIN. READ OUT RATE | 1 |
| 2 | DISK STRUCTURE | 1 |
| 3 | RECORDED DENSITY | 1 |
| 4 - 15 | DATA AREA ALLOCATION | 12 |
| 16 | BURST CUTTING AREA (BCA) DESCRIPTOR | 1 |
| 17 - 31 | RESERVED | 15 |
| 32 | DISK TYPE ID | 1 |
| 33 - 47 | RESERVED | 15 |
| 48 | VELOCITY 1 | 1 |
| 49 | READ POWER AT VELOCITY 1 | 1 |
| 50 | PEAK POWER ON LAND TRACK AT VEL. 1 | 1 |
| 51 | BIAS POWER 1 ON LAND TRACK AT VEL. 1 | 1 |
| 52 | 1ST. PULSE STARTING TIME ON LAND AT V. 1 | 1 |
| 53 | 1ST. PULSE ENDING TIME ON LAND AT V.1 | 1 |
| 54 | MULTI-PULSE DURATION ON LAND AT V.1 | 1 |
| 55 | LAST PULSE STARTING TIME ON LAND AT V.1 | 1 |
| 56 | LAST PULSE ENDING TIME ON LAND AT V.1 | 1 |
| 57 | BIAS POWER 2 DURATION ON LAND AT V.1 | 1 |
| 58 | PEAK POWER ON GROOVE TRACK AT V.1 | 1 |
| 59 | BIAS POWER 1 ON GROOVE TRACK AT V.1 | 1 |
| 60 | 1ST. PULSE STARTING TIME ON GROOVE AT V.1 | 1 |
| 61 | 1ST. PULSE ENDING TIME ON GROOVE AT V.1 | 1 |
| 62 | MULTI-PULSE DURATION ON GROOVE AT V.1 | 1 |
| 63 | LAST PULSE STARTING TIME ON GROOVE AT V.1 | 1 |
| 64 | LAST PULSE ENDING TIME ON GROOVE AT V.1 | 1 |
| 65 | BIAS POWER 2 DURATION ON GROOVE AT V.1 | 1 |
| 66-479 | RESERVED FOR WRITE CONDITIONS AT V2-V24 | 414 |
| 480-2047 | RESERVED | 1568 |

FIG. 15

BOOK TYPE & PART VERSION

| b7 | b6 | b5 | b4 | b3 | b2 | b1 | b0 |
|----|----|----|----|----|----|----|----|
| \multicolumn{4}{c}{BOOK TYPE} | | | | |

| BOOK TYPE | PART VERSION |
|-----------|--------------|

BOOK TYPE> 0001b: SPECIFICATIONS FOR REWRITABLE DISK
> OTHERS: RESERVED

PART VERSION> 0000b: VER. 0.9 FOR TEST USE ONLY
> 0001b: VER. 1.0
> OTHERS: RESERVED

FIG. 16

DISK SIZE & MIN. READ OUT RATE

| b7 | b6 | b5 | b4 | b3 | b2 | b1 | b0 |
|----|----|----|----|----|----|----|----|

| DISK SIZE | MIN. READ OUT RATE |
|-----------|---------------------|

DISK SIZE> 0000b: 12cm DISK
> OTHERS: RESERVED

MINIMUM READ-OUT RATE> 0010b: 10.08 Mbps
OTHERS: RESERVED

FIG. 17

DISK STRUCTURE

| b7 | b6 | b5 | b4 | b3 | b2 | b1 | b0 |
|---|---|---|---|---|---|---|---|
| RES-ERVED | NUMBER OF LAYERS | TRACK PATH | | LAYER TYPE | | | |

NUMBER OF LAYERS> 00b: SINGLE
                > OTHERS: RESERVED
TRACK PATH> RESERVED (0)
LAYER TYPE> 0100b: EACH BIT SHALL BE ASSIGNED
ACCORDING TO THE FOLLOWING RULE IN EVERY DISK
   b3=RESERVED(0)
   b2=0b: NOT CONTAINS REWRITABLE USER DATA AREA(S)
   b2=1b: CONTAINS REWRITABLE USER DATA AREA(S)
   b1=0b: NOT CONTAINS RECORDABLE USER DATA AREA(S)
   b1=1b: CONTAINS RECORDABLE USER DATA AREA(S)
   b0=0b: NOT CONTAINS EMBOSSED USER DATA AREA(S)
   b0=1b: CONTAINS EMBOSSED USER DATA AREA(S)

FIG. 18

RECORDED DENSITY

| b7 | b6 | b5 | b4 | b3 | b2 | b1 | b0 |
|---|---|---|---|---|---|---|---|
| LINEAR DENSITY | | | | TRACK DENSITY | | | |

LINEAR DENSITY> 0010b: 0.410 μm/bit
             > OTHERS: RESERVED
TRACK DENSITY> 0000b: 0.74 μm
           > OTHERS: RESERVED

FIG. 19

DATA AREA ALLOCATION

| BYTE POS. | CONTENTS |
| --- | --- |
| 4 | 00h |
| 5-7 | START SECTOR NUMBER OF DATA AREA (031000h) |
| 8 | 00h |
| 9-11 | END SECTOR NUMBER OF DATA AREA (016B47Fh) |
| 8 | 00h |
| 13-15 | 000000h |

BURST CUTTING AREA (BCA) DESCRIPTOR

BCA FLAG> 0b: BCA NOT EXISTS
> 1b: BCA EXISTS

DISK TYPE ID

DISK TYPE> 00000000b: DISK WITHOUT CASE
             SAHLL BE READ ONLY
        > 00010000b: RESERVED FOR DISK
             WITHOUT CASE CAN
             BE READ & WRITTEN
        > OTHERS:    RESERVED

VELOCITY 1

LINEAR VELOCITY> 00111100b: 6.0 m/s
    THIS BYTE SHALL DEFINE THE CENTER LINEAR VELOCITY FOR USING DISK.
    ACTUAL LINEAR VELOCITY SHALL BE SPECIFIED AS:
    ACTUAL LINEAR VELOCITY = VALUE x 0.1 m/s

READ POWER AT VELOCITY 1

| b7 | b6 | b5 | b4 | b3 | b2 | b1 | b0 |
|----|----|----|----|----|----|----|----|
| READ POWER ||||||||

READ POWER> 00001010b: 1.0 mW

THIS BYTE SHALL SPECIFY THE READ POWER ON THE SURFACE OF DISK FOR PLAYING AT LINEAR VELOCITY 1.

ACTUAL READ POWER SHALL BE SPECIFIED AS:
ACTUAL READ POWER = VALUE x 0.1 mW

FIG. 24

PEAK POWER ON LAND TRACK AT VEL. 1

| b7 | b6 | b5 | b4 | b3 | b2 | b1 | b0 |
|----|----|----|----|----|----|----|----|
| PEAK POWER ||||||||

PEAK POWER> 01101001b: 10.5 mW

THIS BYTE SHALL SPECIFY THE PEAK POWER ON THE SURFACE OF DISK FOR RECORDING ON LAND TRACK AT LINEAR VELOCITY 1.

ACTUAL PEAK POWER SHALL BE SPECIFIED AS:
ACTUAL PEAK POWER = VALUE x 0.1 mW

FIG. 25

BIAS POWER 1 ON LAND TRACK AT VEL. 1

| b7 | b6 | b5 | b4 | b3 | b2 | b1 | b0 |
|----|----|----|----|----|----|----|----|
| \multicolumn{8}{c}{BIAS POWER 1} |

BIAS POWER 1> 00101101b: 4.5 mW

THIS BYTE SHALL SPECIFY THE BIAS POWER 1 ON THE SURFACE OF DISK FOR RECORDING ON LAND TRACK AT LINEAR VELOCITY 1.

ACTUAL BIAS POWER 1 SHALL BE SPECIFIED AS:
ACTUAL BIAS POWER 1 = VALUE x 0.1 mW

FIG. 26

1ST. PULSE STARTING TIME ON LAND AT V. 1

| b7 | b6 | b5 | b4 | b3 | b2 | b1 | b0 |
|----|----|----|----|----|----|----|----|
|    | \multicolumn{7}{c}{STARTING TIME} |

DIRECTION (b7)

DIRECTION> 0b:
  THIS BIT SHALL BE ASSIGNED ACCORDING TO THE FOLLOWING RULE:
  0b: THE SAME DIRECTION TO LASER SPOT SCANNING
  1b: THE OPPOSITE DIRECTION TO LASER SPOT SCANNING

STARTING TIME> 0010001b: 17 ns (Tw/2)
  THIS BYTE SHALL SPECIFY THE FIRST PULSE STARTING TIME (TSFP) FOR RECORDING ON LAND TRACK AT LINEAR VELOCITY 1.
  ACTUAL STARTING TIME SHALL BE SPECIFIED AS:
  ACTUAL STARTING TIME = VALUE x 1 ns

FIG. 27

1ST. PULSE ENDING TIME ON LAND AT VELOCITY 1

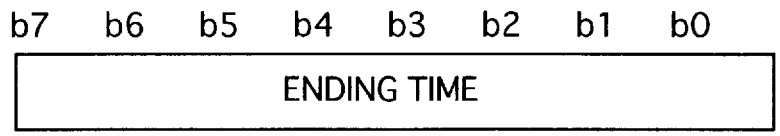

ENDING TIME> 00110011b: 51 ns (3Tw/2)
    THIS BYTE SHALL SPECIFY THE FIRST PULSE ENDING TIME (TEFP) FOR RECORDING ON LAND TRACK AT LINEAR VELOCITY 1.
      ACTUAL ENDING TIME SHALL BE SPECIFIED AS:
      ACTUAL ENDING TIME = VALUE x 1 ns

FIG. 28

MULTI-PULSE DURATION ON LAND AT VELOCITY 1

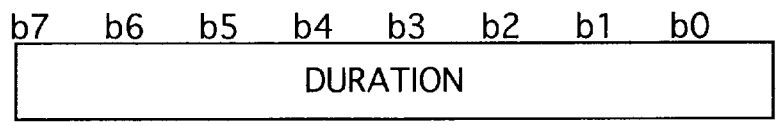

DURATION> 00010001b: 17 ns (Tw/2)
    THIS BYTE SHALL SPECIFY THE MULTI-PULSE DURATION (TMP) FOR RECORDING ON LAND TRACK AT LINEAR VELOCITY 1.
      ACTUAL DURATION TIME SHALL BE SPECIFIED AS:
      ACTUAL DURATION TIME = VALUE x 1 ns

FIG. 29

LAST PULSE STARTING TIME ON LAND AT VELOCITY 1

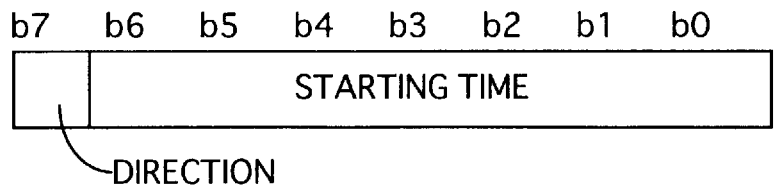

DIRECTION> 0b:
THIS BIT SHALL BE ASSIGNED ACCORDING TO THE FOLLOWING RULE:
  0b: THE SAME DIRECTION TO LASER SPOT SCANNING
  1b: THE OPPOSITE DIRECTION TO LASER SPOT SCANNING
STARTING TIME> 0000001b: 0 ns
THIS BYTE SHALL SPECIFY THE LAST PULSE STARTING TIME (TSLP) FOR RECORDING ON LAND TRACK AT LINEAR VELOCITY 1.
  ACTUAL STARTING TIME SHALL BE SPECIFIED AS:
  ACTUAL STARTING TIME = VALUE x 1 ns

FIG. 30

LAST PULSE ENDING TIME ON LAND AT VELOCITY 1

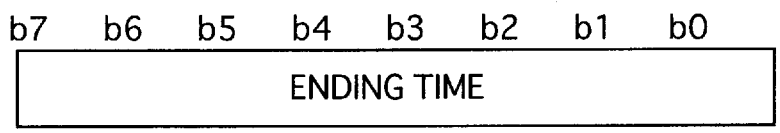

ENDING TIME> 00100010b: 34 ns (Tw)
THIS BYTE SHALL SPECIFY THE LAST PULSE ENDING TIME (TELP) FOR RECORDING ON LAND TRACK AT LINEAR VELOCITY 1.
  ACTUAL ENDING TIME SHALL BE SPECIFIED AS:
  ACTUAL ENDING TIME = VALUE x 1 ns

FIG. 31

BIAS POWER 2 DURATION ON LAND AT VELOCITY 1

| b7 | b6 | b5 | b4 | b3 | b2 | b1 | b0 |
|----|----|----|----|----|----|----|----|
| DURATION ||||||||

DURATION> 01000100b: 68 ns (2Tw)

THIS BYTE SHALL SPECIFY THE BIAS POWER 2 DURATION (TLE) FOR RECORDING ON LAND TRACK AT LINEAR VELOCITY 1.

ACTUAL DURATION TIME SHALL BE SPECIFIED AS:
ACTUAL DURATION TIME = VALUE x 1 ns

FIG. 32

PEAK POWER ON GROOVE TRACK AT VELOCITY 1

| b7 | b6 | b5 | b4 | b3 | b2 | b1 | b0 |
|----|----|----|----|----|----|----|----|
| PEAK POWER ||||||||

PEAK POWER> 01101001b: 10.5 mW

THIS BYTE SHALL SPECIFY THE PEAK POWER ON THE SURFACE OF DISK FOR RECORDING ON GROOVE TRACK AT LINEAR VELOCITY 1.

ACTUAL PEAK POWER SHALL BE SPECIFIED AS:
ACTUAL PEAK POWER = VALUE x 0.1 mW

FIG. 33

BIAS POWER 1 ON GROOVE TRACK AT VELOCITY 1

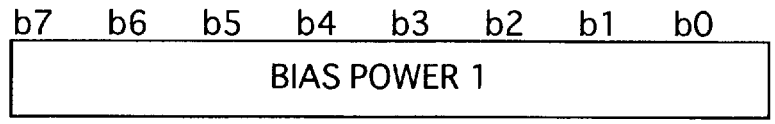

BIAS POWER 1> 00101101b: 4.5 mW
  THIS BYTE SHALL SPECIFY THE BIAS POWER 1 ON THE SURFACE OF DISK FOR RECORDING ON GROOVE TRACK AT LINEAR VELOCITY 1.
    ACTUAL BIAS POWER 1 SHALL BE SPECIFIED AS:
    ACTUAL BIAS POWER 1 = VALUE x 0.1 mW

FIG. 34

1ST. PULSE STARTING TIME ON GROOVE AT VELOCITY 1

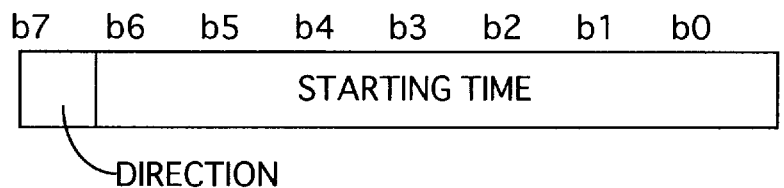

DIRECTION> 0b:
  THIS BIT SHALL BE ASSIGNED ACCORDING TO THE FOLLOWING RULE:
    0b: THE SAME DIRECTION TO LASER SPOT SCANNING
    1b: THE OPPOSITE DIRECTION TO LASER SPOT SCANNING
STARTING TIME> 0010001b: 17 ns (Tw/2)
  THIS BYTE SHALL SPECIFY THE FIRST PULSE STARTING TIME (TSLP) FOR RECORDING ON GROOVE TRACK AT LINEAR VELOCITY 1.
    ACTUAL STARTING TIME SHALL BE SPECIFIED AS:
    ACTUAL STARTING TIME = VALUE x 1 ns

FIG. 35

1ST. PULSE ENDING TIME ON GROOVE AT VELOCITY 1

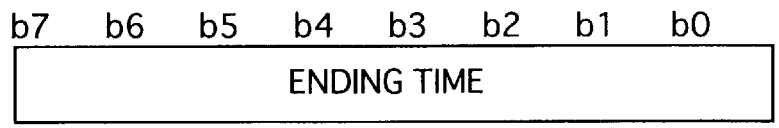

ENDING TIME> 00110011b: 51 ns (3Tw/2)
   THIS BYTE SHALL SPECIFY THE FIRST PULSE
ENDING TIME (TEFP) FOR RECORDING ON
GROOVE TRACK AT LINEAR VELOCITY 1.
      ACTUAL ENDING TIME SHALL BE SPECIFIED AS:
      ACTUAL ENDING TIME = VALUE x 1 ns

FIG. 36

MULTI-PULSE DURATION ON GROOVE AT VELOCITY 1

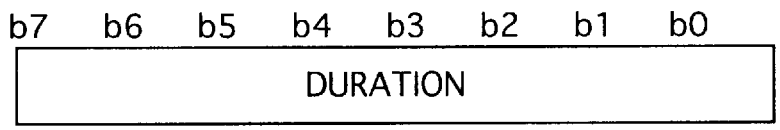

DURATION> 00010001b: 17 ns (Tw/2)
   THIS BYTE SHALL SPECIFY THE MULTI-PULSE
DURATION (TMP) FOR RECORDING ON GROOVE TRACK
AT LINEAR VELOCITY 1.
      ACTUAL DURATION TIME SHALL BE SPECIFIED AS:
      ACTUAL DURATION TIME = VALUE x 1 ns

FIG. 37

LAST PULSE STARTING TIME ON GROOVE AT VELOCITY 1

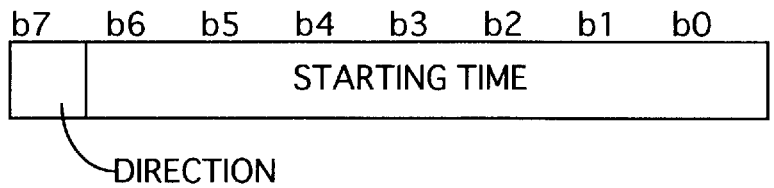

DIRECTION> 0b:
  THIS BIT SHALL BE ASSIGNED ACCORDING TO THE FOLLOWING RULE:
  0b: THE SAME DIRECTION TO LASER SPOT SCANNING
  1b: THE OPPOSITE DIRECTION TO LASER SPOT SCANNING
STARTING TIME> 0000000b: 0 ns
  THIS BYTE SHALL SPECIFY THE LAST PULSE STARTING TIME (TSLP) FOR RECORDING ON GROOVE TRACK AT LINEAR VELOCITY 1.
    ACTUAL STARTING TIME SHALL BE SPECIFIED AS:
    ACTUAL STARTING TIME = VALUE x 1 ns

FIG. 38

LAST PULSE ENDING TIME ON GROOVE AT VELOCITY 1

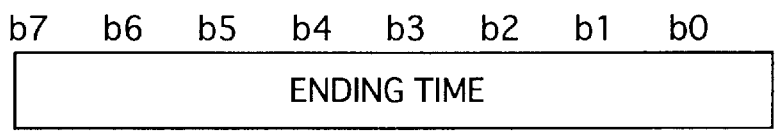

ENDING TIME> 00100010b: 34 ns (Tw)
  THIS BYTE SHALL SPECIFY THE LAST PULSE ENDING TIME (TELP) FOR RECORDING ON GROOVE TRACK AT LINEAR VELOCITY 1.
    ACTUAL ENDING TIME SHALL BE SPECIFIED AS:
    ACTUAL ENDING TIME = VALUE x 1 ns

FIG. 39

BIAS POWER 2 DURATION ON GROOVE AT VELOCITY 1

| b7 | b6 | b5 | b4 | b3 | b2 | b1 | b0 |
|----|----|----|----|----|----|----|----|
| DURATION ||||||||

DURATION> 01000100b: 68 ns (2Tw)
   THIS BYTE SHALL SPECIFY THE BIAS POWER 2 DURATION (TLE) FOR RECORDING ON GROOVE TRACK AT LINEAR VELOCITY 1.
      ACTUAL DURATION TIME SHALL BE SPECIFIED AS:
      ACTUAL DURATION TIME = VALUE x 1 ns

FIG. 40

RESERVED FOR WRITE CONDITIONS
AT VELOCITIES V2-V24

| BYTE POS. | CONTENTS |
|-----------|----------|
| 66-479    | ALL 00h  |
| 480-2047  | ALL 00h  |

FIG. 41

INFORMATION RECORDING DISK WITH MANAGEMENT AREAS

BACKGROUND OF THE INVENTION

The present invention relates to a recording information management method for a disk of a zone CLV (every time the recording track zone changes, the angular velocity changes; the angular velocity does not change in a zone) or a modified CAV (the angular velocity changes stepwise depending on the recording track position; the angular velocity does not change in each step) type.

In zone CLV (to be referred to as ZCLV hereinafter; CLV is the abbreviation of Constant Linear Velocity), the angular velocity is controlled to be constant in each zone (CAV; Constant Angular Velocity). When the recording track zone changes, the rotation speed (angular velocity) changes so that the average recording density in each zone becomes almost constant. That is, in ZCLV, CAV control is performed in each zone, and when the zone changes, the angular velocity changes accordingly.

In zone CAV (ZCAV) or modified CAV (MCAV), CAV control is performed in all zones, and when the zone changes, the read/write modulation rate changes.

For a ZCLV disk, the rotation servo of the disk need not be switched in each zone because the angular velocity does not change in each zone so that access properties similar to those of a CAV disk can be obtained in each zone. In ZCLV, when the zone changes, the angular velocity is changed (reduced in the outer zone of the disk). With this operation, a decrease in recording density on the outer side of the disk is prevented by maintaining a roughly constant average linear velocity on both inner and outer sides of the disk. Therefore, in the ZCLV disk, a memory capacity similar to that of a CLV disk (within the same zone) and access properties similar to those of a CAV disk can be obtained.

All writable disks of the CLV, CAV, and ZCLV schema require management information representing the size and position of a file recorded in the disk. This management information is generally called a file allocation table (FAT) and a set of pieces of management information are recorded in a specific area (one or two areas; in the case of two areas, one area is used as a backup area) of the disk.

The FAT is appropriately referred to when data is to be read out from or written in the disk. In the CAV disk (e.g., a hard disk), the disk rotation speed is always constant. The rotation servo of the disk need not be switched (the rotation speed of a spindle motor need not be changed) even when an FAT reference operation is frequently performed during data reading/writing, and reading/writing is performed smoothly.

In the ZCLV disk, however, the disk rotation speed of the data read/write area is different from that of the FAT area. For this reason, the rotation speed of the spindle motor must be changed every time in which the FAT is referred, and the read/write access speed decreases (since the rotation servo is switched every time the optical pickup reciprocates between constant rotation speed zones, a time lag until the servo settles to a target rotation value is generated every time the zone changes).

BRIEF SUMMARY OF THE INVENTION

It is a first object of the present invention to provide an information recording disk which increases the speed of file management processing in reading/writing information.

It is a second object of the present invention to provide a write management method for an information recording disk which increases the speed of file management processing in reading/writing information.

In order to achieve the above objects, according to the present invention, a file management area is formed for each constant rotation speed zone (in each constant angular velocity zone).

Three methods are available to arrange the file management areas in units of constant angular velocity zones:

(1) The file management area is arranged in the constant angular velocity zone on the inner side of the disk.

(2) The file management area is arranged in the constant angular velocity zone on the outer side of the disk.

(3) The file management area is arranged in the constant angular velocity zone at an optional position (e.g., at an intermediate position in the constant angular velocity zone).

According to (1), an information recording disk which is rotated at one of a plurality of rotation speeds (N1–N4) to record information comprises:

a first data area (e.g., DA1) formed spirally or concentrically with a center of rotation of the disk (OD), in which information is recorded when the disk is being rotated at a first rotation speed (e.g., N1);

a first management area (e.g., MA1) formed spirally or concentrically with the center of rotation of the disk (OD) on a side closer to the center of rotation of the disk than the first data area (DA1), in which management information associated with writing is recorded when writing is to be performed in the first data area (DA1) during rotation of the disk (OD) at the first rotation speed (N1);

a second data area (e.g., DA2) formed spirally or concentrically with the center of rotation of the disk (OD), in which information is recorded when the disk is being rotated at a second rotation speed (e.g., N2); and a second management area (e.g., MA2) formed spirally or concentrically with the center of rotation of the disk (OD) on a side closer to the center of rotation of the disk than the second data area (DA2), in which management information associated with writing is recorded when writing is to be performed in the second data area (DA2) during rotation of the disk (OD) at the second rotation speed (N2).

According to the management method of the present invention, in recording information in the information recording disk, write information management (ST36) for the first data area (DA1) is performed only in the first management area (MA1), and write information management (ST36) for the second data area (DA2) is performed only in the second management area (MA2).

According to (2), an information recording disk which is rotated at one of a plurality of rotation speeds (N1–N4) to record information, comprises:

a first data area (e.g., DA1) formed spirally or concentrically with a center of rotation of the disk (OD), in which information is recorded when the disk is being rotated at a first rotation speed (e.g., N1);

a first management area (e.g., MA1) formed spirally or concentrically with the center of rotation of the disk (OD) on a side farther from the center of rotation of the disk than the first data area (DA1), in which management information associated with writing is recorded when writing is to be performed in the first data area (DA1) during rotation of the disk (OD) at the first rotation speed (N1);

a second data area (e.g., DA2) formed spirally or concentrically with the center of rotation of the disk (OD), in which information is recorded when the disk is being rotated at a second rotation speed (e.g., N2); and a second management area (e.g., MA2) formed spirally or concentrically with the center of rotation of the disk (OD) on a side farther from the center of rotation of the disk than the second data area (DA2), in which management information associated with writing is recorded when writing is to be performed in the second data area (DA2) during rotation of the disk (OD) at the second rotation speed (N2).

According to the management method of the present invention, in recording information in the information recording disk, write information management (ST36) for the first data area (DA1) is performed only in the first management area (MA1), and write information management (ST36) for the second data area (DA2) is performed only in the second management area (MA2).

According to (3), an information recording disk which is rotated at one of a plurality of rotation speeds (N1–N4) to record information, comprises:

a first data area (e.g., DA1) formed spirally or concentrically with a center of rotation of the disk (OD), in which information is recorded when the disk is being rotated at a first rotation speed (e.g., N1);

a first management area (e.g., MA1) formed spirally or concentrically with the center of rotation of the disk (OD) in the first data area (DA1), in which management information associated with writing is recorded when writing is to be performed in the first data area (DA1) during rotation of the disk (OD) at the first rotation speed (N1);

a second data area (e.g., DA2) formed spirally or concentrically with the center of rotation of the disk (OD), in which information is recorded when the disk is being rotated at a second rotation speed (e.g., N2); and a second management area (e.g., MA2) formed spirally or concentrically with the center of rotation of the disk (OD) in the second data area (DA2), in which management information associated with writing is recorded when writing is to be performed in the second data area (DA2) during rotation of the disk (OD) at the second rotation speed (N2).

According to the management method of the present invention, in recording information in the information recording disk, write information management (ST36) for the first data area (DA1) is performed only in the first management area (MA1), and write information management (ST36) for the second data area (DA2) is performed only in the second management area (MA2).

Additional objects and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 is a table for explaining the arrangement of data areas (DA1 to DA4) and replacement/management areas (MA1 to MA4) in units of track groups (#001 to #100; #101 to #200; #201 to #300; #301 to #400) with disk rotation speeds (N1 to N4) in an optical disk having the data track arrangement shown in FIG. 5 or 6;

FIG. 14 explains the configuration of a control data zone in the embossed data zone of FIG. 13;

FIG. 15 explains the configuration of the physical format information of FIG. 14;

FIG. 16 explains the data structure of the "book type and part version" of FIG. 15;

FIG. 17 explains the data structure of the "disk size and minimum read out rate" of FIG. 15;

FIG. 18 explains the data structure of the "disk structure" of FIG. 15;

FIG. 19 explains the data structure of the "recorded density" of FIG. 15;

FIG. 24 explains the data structure of the "read power at velocity 1" of FIG. 15;

FIG. 25 explains the data structure of the "peak power on the land track at velocity 1" of FIG. 15;

FIG. 26 explains the data structure of the "bias power 1 on the land track at velocity 1" of FIG. 15;

FIG. 27 explains the data structure of the "first pulse starting time on the land track at velocity 1" of FIG. 15;

FIG. 28 explains the data structure of the "first pulse ending time on the land track at velocity 1" of FIG. 15;

FIG. 29 explains the data structure of the "multi-pulse duration on the land track at velocity 1" of FIG. 15;

FIG. 30 explains the data structure of the "last pulse starting time on the land track at velocity 1" of FIG. 15;

FIG. 31 explains the data structure of the "last pulse ending time on the land track at velocity 1" of FIG. 15;

FIG. 32 explains the data structure of the "bias power 2 duration on the land track at velocity 1" of FIG. 15;

FIG. 33 explains the data structure of the "peak power on the groove track at velocity 1" of FIG. 15;

FIG. 34 explains the data structure of the "bias power 1 on the groove track at velocity 1" of FIG. 15;

FIG. 35 explains the data structure of the "first pulse starting time on the groove track at velocity 1" of FIG. 15;

FIG. 36 explains the data structure of the "first pulse ending time on the groove track at velocity 1" of FIG. 15;

FIG. 37 explains the data structure of the "multi-pulse duration on the groove track at velocity 1" of FIG. 15;

FIG. 38 explains the data structure of the "last pulse starting time on the groove track at velocity 1" of FIG. 15;

FIG. 39 explains the data structure of the "last pulse ending time on the groove track at velocity 1" of FIG. 15;

FIG. 40 explains the data structure of the "bias power 2 duration on the groove track at velocity 1" of FIG. 15; and FIG. 41 explains the configuration of the data areas reserved for write conditions at velocities V2 to V24 of FIG. 15.

DETAILED DESCRIPTION OF THE INVENTION

Figure 1:
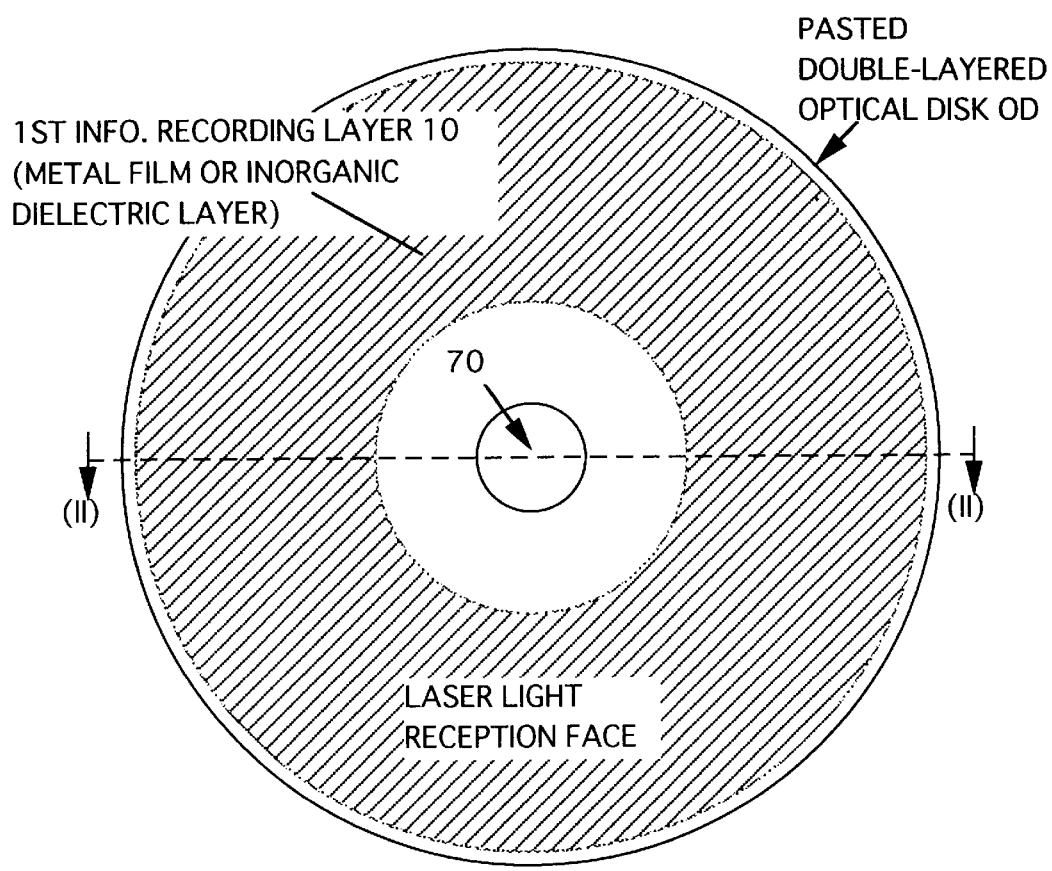
FIG. 1 is a plan view of a pasted double-layered optical disk according to an embodiment of the present invention when viewed from a laser light reception face side.

An information recording disk according to an embodiment of the present invention and an information management method using this disk will be described below with reference to the accompanying drawing. The same reference numerals denote the same parts throughout the drawing, and a detailed description thereof will be omitted.

Figure 9:
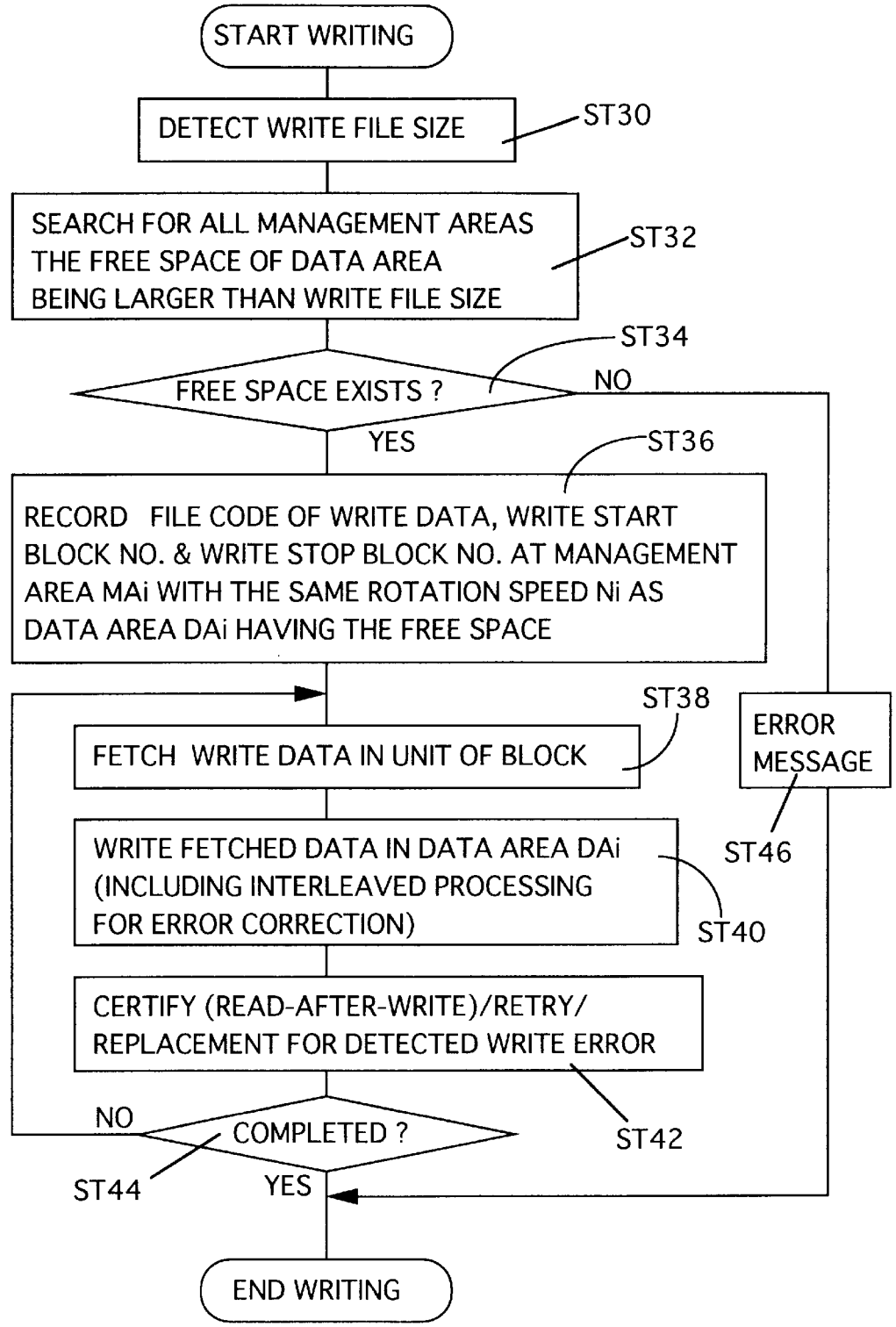
FIG. 9 is a flow chart for explaining writing in the optical disk having the data track arrangement shown in FIG. 5 or 6.
Figure 10:
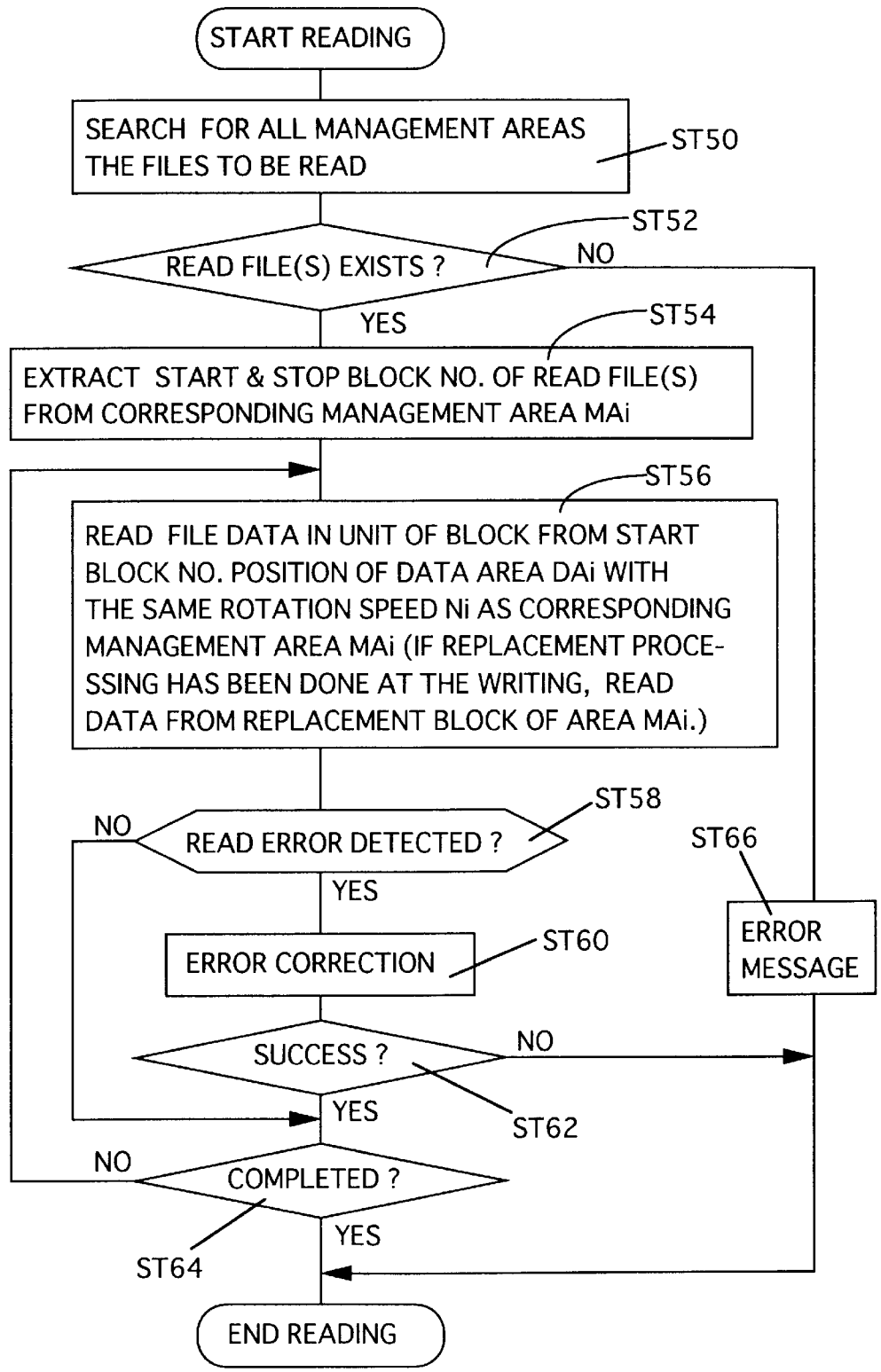
FIG. 10 is a flow chart for explaining reading in the optical disk having the data track arrangement shown in FIG. 5 or 6.
Figure 11:
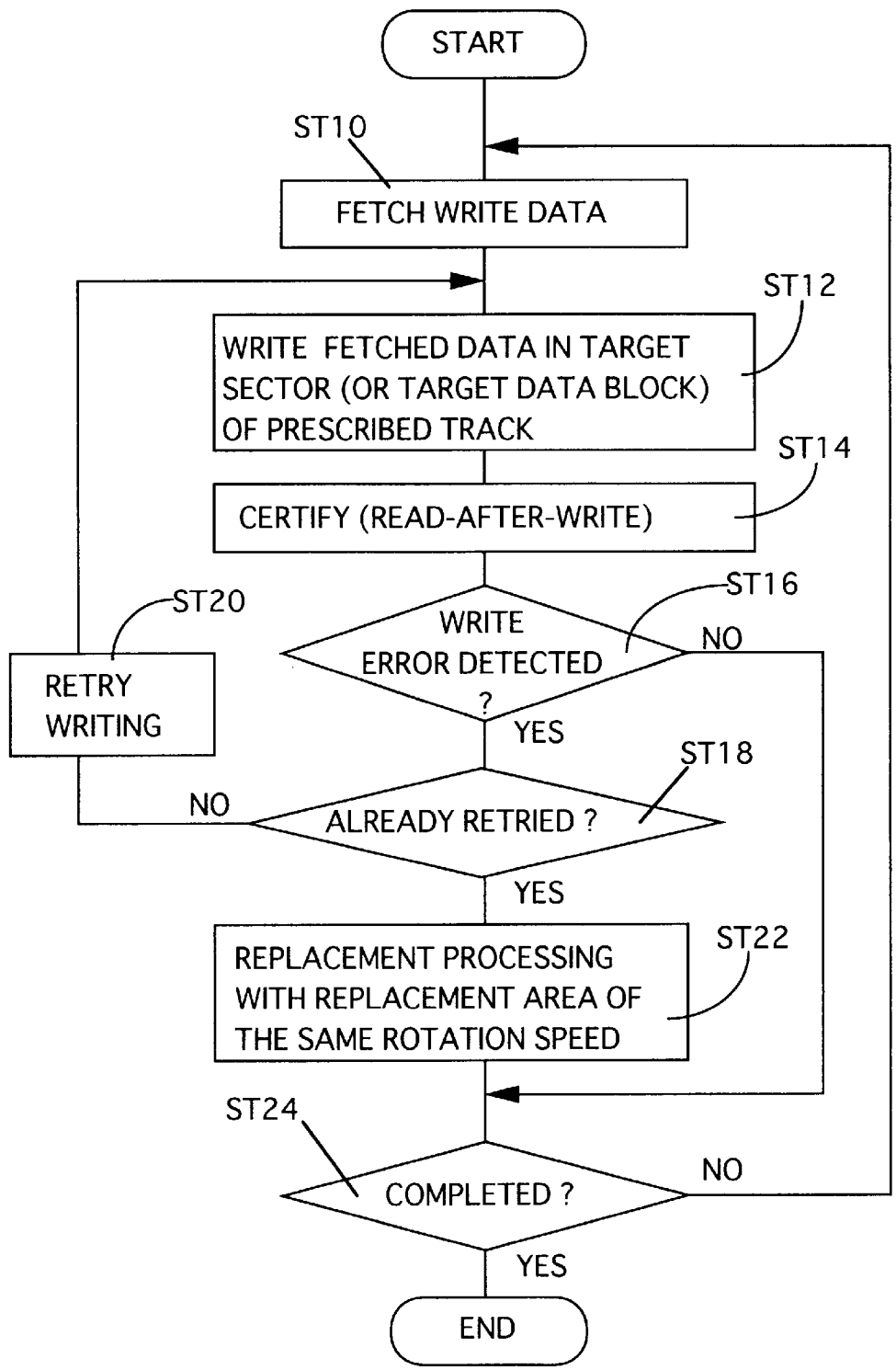
FIG. 11 is a flow chart for explaining replacement in the optical disk having the data track arrangement shown in FIG. 5 or 6.

FIGS. 1 to 8 are views for explaining the information recording disk according to an embodiment of the present invention. FIGS. 9 to 11 are views for explaining the information management method for the information recording disk according to the embodiment of the present invention. FIGS. 12 to 41 are views for explaining the format of the information recording disk according to the embodiment of the present invention.

FIG. 1 is a plan view showing double-layered optical disk OD used as an example of the pasted double-layered information recording medium of the present invention when viewed from a read laser reception face side. Optical disk OD has an outer diameter of 120 mm and central hole 70 with an inner diameter of 15 mm. Optical disk OD has a thickness of 1.2 mm corresponding to two 0.6-mm thick substrates which are pasted. Each of the pasted substrates has a doughnut-shaped information recording layer (data areas and replacement/management areas to be described later) (FIG. 1 shows only first information recording layer 10 on one substrate). The inner diameter of the doughnut-shaped information recording layer is about 45 mm, and the outer diameter is about 117 mm at maximum.

Figure 2:
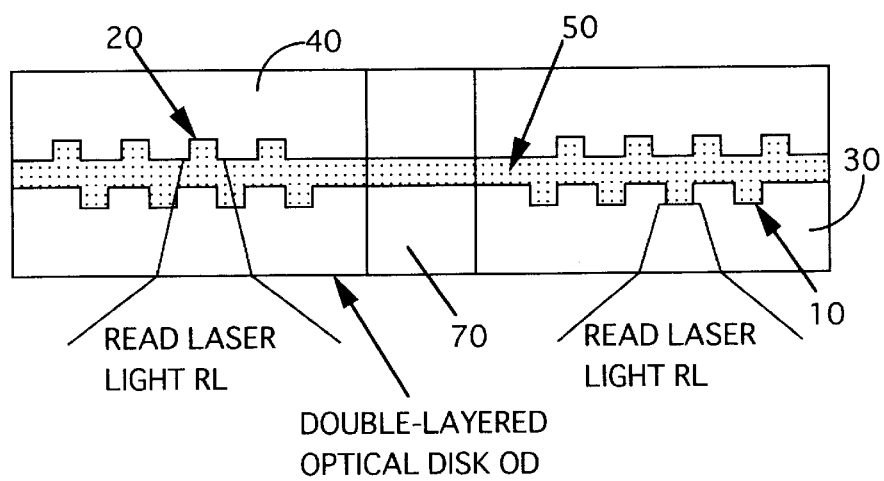
FIG. 2 is a view illustrating part of a section taken along a line (II)—(II) in FIG. 1.

FIG. 2 illustrates an enlarged view of part of the section of double-layered optical disk OD shown in FIG. 1 taken along a line (II)—(II). As shown in FIG. 2, disk OD comprises polycarbonate substrate 30 (thickness: about 0.6 mm) for holding the first information recording layer, first information recording layer 10 (semi-transparent film having a thickness of about 10 to 1,000 nm) in which first information (upper face information of disk OD) formed by embossed pits is recorded, adhesive layer 50 (e.g., a UV curing resin) transparent to laser light RL, second information recording layer 20 (light-reflection film having a thickness of about 100 nm) in which second information (lower face information of optical disk OD) formed by embossed pits is recorded, and polycarbonate substrate 40 for holding the second information, viewed from a face on which read laser light RL (e.g., a semiconductor laser beam having a wavelength of 650 nm) is incident.

A label on which information (visual pattern information including characters, pictures, and patterns) associated with the recording information (the above-described first information and second information) is printed is bonded onto substrate face 40 on the opposite side of light reception face 30 of read laser light RL, as needed.

Figure 3:
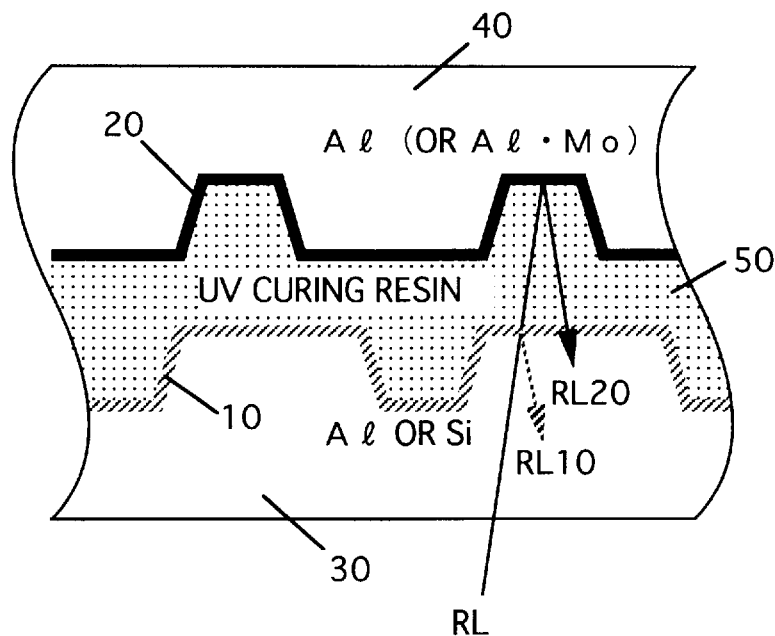
FIG. 3 is a partial sectional view illustrating the data recording portion (data is recorded by zone CAV or modified CAV) of the double-layered optical disk (read only) shown in FIG. 1.

FIG. 3 is a partial sectional view illustrating the data recording portion (embossed pits) of the double-layered optical disk (read only) shown in FIG. 1. A very thin metal film (thickness: about 10 to 20 nm) or a silicon (Si) thin film (thickness: about 10 to 1,000 nm) having a refractive index n of about 4 is used as first information recording layer 10. Information recording layer 10 may be formed of another semi-transparent metal film or another semi-transparent inorganic dielectric film having a refractive index higher than that of polycarbonate substrate 30D, i.e., 1.6 (e.g., an $Si_3N_4$ thin film having a refractive index of about 2.0).

The reason why the refractive index of information recording layer (semi-transparent inorganic dielectric film) 10 is made higher than that of substrate 30 is that laser light RL focused and incident in layer 10 need be reflected by an interface (a plane at which the refractive index abruptly changes) between layer 10 and substrate 30 (if the refractive index of layer 10 is equal to that of substrate 30, layer 10 and substrate 30 are formed of an optically uniform material with respect to laser light RL, so reflection of laser light does not occur at the interface between layer 10 and substrate 30. Reflected light RL10 from layer 10 is almost eliminated, so the first information recorded in layer 10 cannot be read).

When information recording layer 10 is a metal film such as a gold film, the refractive index need not be taken into consideration, although thickness management for the layer is important (if layer 10 is too thick, light reflected by second information recording layer 20 is largely shielded by layer 10, lowering the read C/N ratio of layer 20; if layer 10 is too thin, light reflected by information recording layer 10 is weakened, lowering the read C/N ratio).

Figure 4:
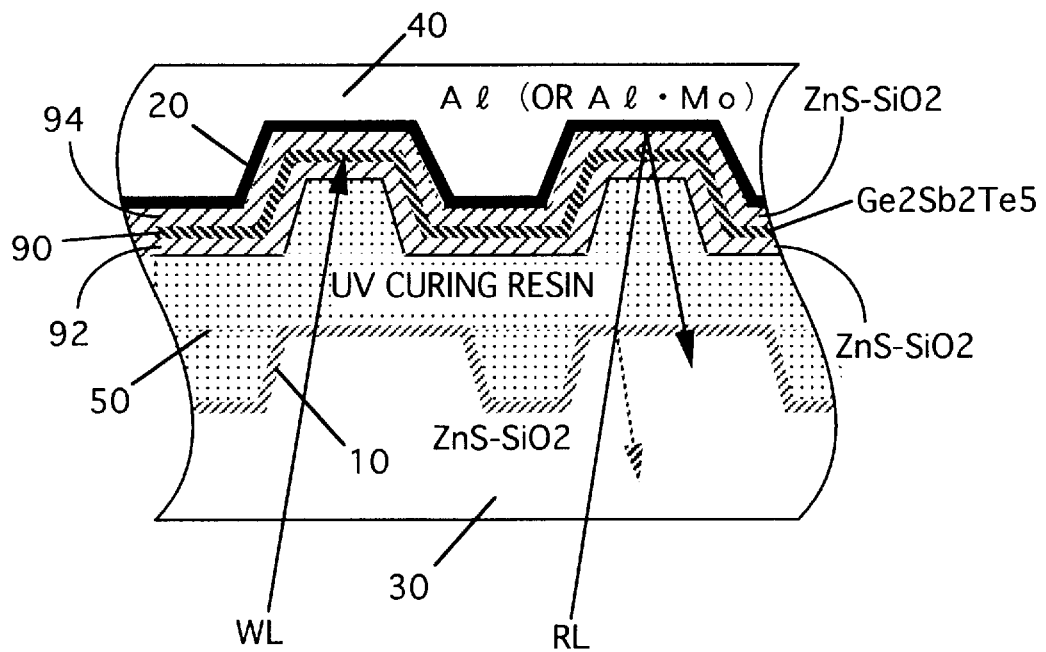
FIG. 4 is a partial sectional view illustrating the data recording portion (data is recorded by zone CAV or modified CAV) of the double-layered optical disk (phase change read/write) shown in FIG. 1.

FIG. 4 is a partial sectional view illustrating the data recording portion of read/write pasted double-layered optical disk OD in FIG. 1. Information recording layer 10 having a thickness of, e.g., 20 nm is formed of, instead of silicon shown in FIG. 3, a mixture ($ZnS/SiO_2$) of zinc sulfide (ZnS) and silicon oxide ($SiO_2$).

In addition, a triple layer (90 to 94) consisting of two ZnS/SiO$_2$ mixture layers (92 and 94) with phase change recording material layer 90 (Ge$_2$Sb$_2$Te$_5$) sandwiched therebetween is formed between reflection layer 20 using aluminum (Al) or aluminum-molybdenum alloy (Al—Mo) and UV curing resin adhesive layer 50.

The thickness of aluminum reflection film 20 is selected to be, e.g., about 100 nm. The thickness of ZnS/SiO$_2$ mixture layer 94 is selected to be, e.g., about 20 nm. The thickness of Ge$_2$Sb$_2$Te$_5$ phase change recording material layer 90 is selected to be, e.g., about 20 nm. The thickness of ZnS/SiO$_2$ mixture layer 92 is selected to be, about 180 nm.

The read only information is recorded as an embossed pit signal in substrate 30. However, no embossed pit signal is recorded in substrate 40 of the read/write disk. Instead, a continuous groove is formed in substrate 40. Phase change recording material layer 90 is formed in this groove.

A data area to be described later is formed on layer 10 or 20 shown in FIG. 3 or on layer 10 or 90 shown in FIG. 4. A replacement/management area to be described later is formed on layer 90 shown in FIG. 4.

Since no replacement/management areas in which data is written later can be arranged in the read only optical disk shown in FIG. 3, the present invention cannot be practiced with only the structure shown in FIG. 3. However, the present invention can be applied to an optical disk which has both the structures shown in FIGS. 3 and 4 (e.g., an optical disk having the structure in FIG. 3 at part of the inner side and the structure in FIG. 4 at part of the outer side).

Figure 5:
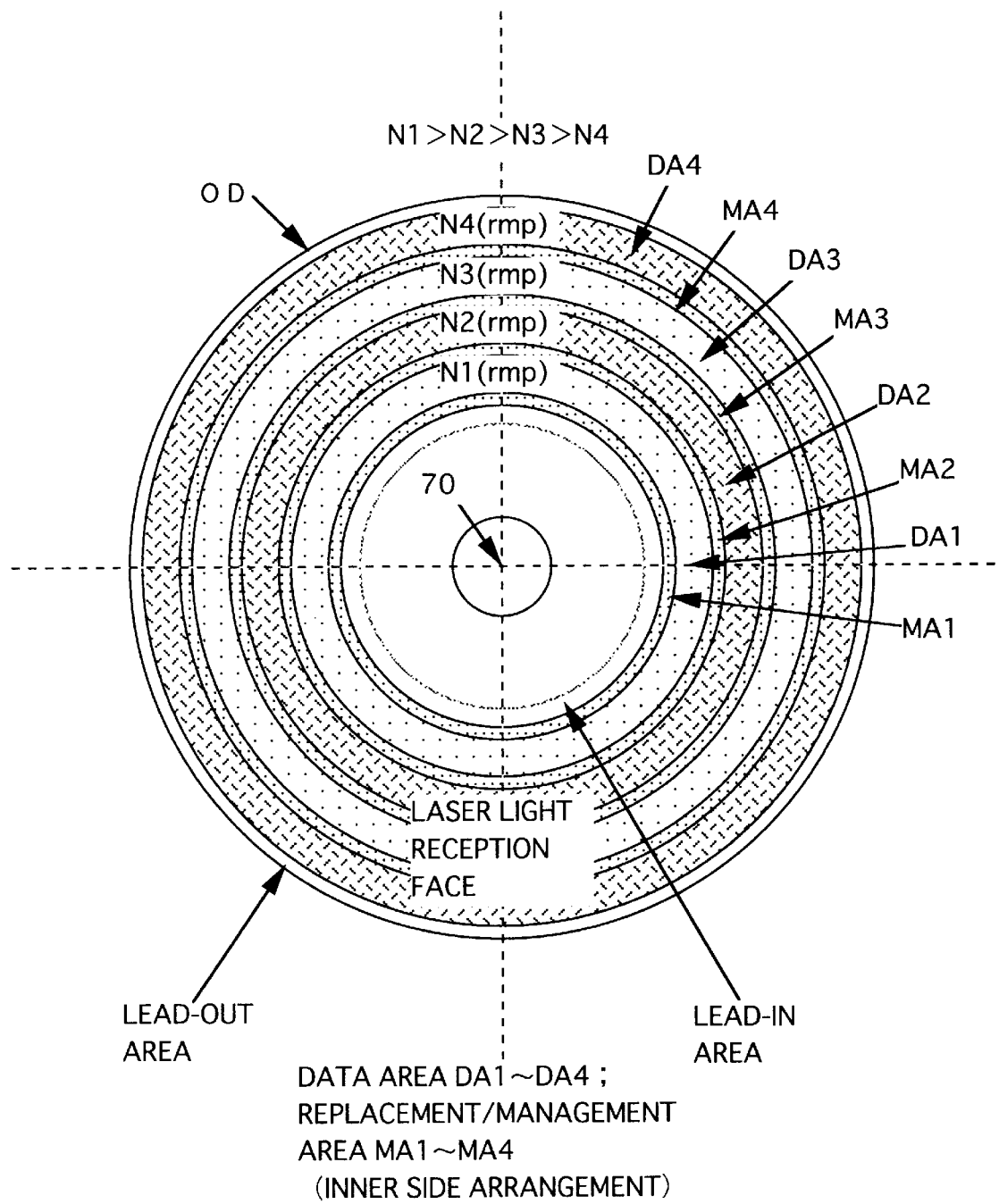
FIG. 5 is a view for explaining data track arrangement 1 (a replacement/management area is arranged on an inner side of each data area) of the double-layered optical disk shown in FIG. 4.

FIG. 5 is a view for explaining data track arrangement 1 (a replacement/management area is arranged on an inner side of each data area) of the double-layered optical disk shown in FIG. 4.

In this arrangement, replacement/management area MA1 whose rotation speed (rpm) is N1 is arranged spirally or concentrically with data area DA1 whose rotation speed is N1. Replacement/management area MA1 can be arranged at any portion in the zone where the rotation speed is equal to that of the data area DA1. In this case, replacement/management area MA1 is arranged on the inner side of disk OD.

Similarly, data area DA2 with rotation speed N2 is arranged outside data area DA1, and replacement/management area MA2 with rotation speed N2 is arranged spirally or concentrically with data area DA2. Data area DA3 with rotation speed N3 is arranged outside data area DA2, and replacement/management area MA3 with rotation speed N3 is arranged spirally or concentrically with data area DA3. Data area DA4 with rotation speed N4 is arranged outside data area DA3, and replacement/management area MA4 with rotation speed N4 is arranged spirally or concentrically with data area DA4.

In this data area arrangement, the relation between the rotation speeds of the constant rotation zones is defined as N1>N2>N3>N4 to average the recording densities of the rotation zones (DA1+MA1; DA2+MA2; DA3+MA3; DA4+MA4), thereby ensuring a large recording capacity in the entire disk.

The number of data areas or replacement/management areas (the number of zones with constant rotation speeds) is set to four for descriptive convenience. However, the number of areas (the number of zones) may be larger in an actual disk, or the present invention can be practiced even with three or fewer zones.

When data is to be written in data area DA1 of optical disk OD having the structure shown in FIG. 5, management (management of the data write range in the data area DA1) is performed only in replacement/management area MA1 of the same rotation speed zone. Similarly, write management in data area DA2 is performed only in replacement/management area MA2 of the same rotation speed zone. Write management in data area DA3 is performed only in replacement/management area MA3 of the same rotation speed zone. Write management in data area DA4 is performed only in replacement/management area MA4 of the same rotation speed zone.

With this arrangement, the rotation speed of disk OD need not be switched during write management. Therefore, writing can be performed at a higher speed.

On the other hand, when data is to be read out from data area DA1 of optical disk OD having the structure shown in FIG. 5, management (management of the data read range in the data area DA1) is performed referring to only replacement/management area MA1 of the same rotation speed zone. Similarly, read management in data area DA2 is performed referring to only replacement/management area MA2 of the same rotation speed zone. Read management in data area DA3 is performed referring to only replacement/management area MA3 of the same rotation speed zone. Read management in data area DA4 is performed referring to only replacement/management area MA4 of the same rotation speed zone.

With this arrangement, the rotation speed of disk OD need not be switched during reading. Therefore, reading can be performed at a higher speed.

In addition, when a write error is generated in data area DA1 of optical disk OD having the structure shown in FIG. 5, replacement is performed only in replacement/management area MA1 of the same rotation speed zone. Similarly, replacement of a write error generated in data area DA2 is performed only in replacement/management area MA2 of the same rotation speed zone. Replacement of a write error generated in data area DA3 is performed only in replacement/management area MA3 of the same rotation speed zone. Replacement of a write error generated in data area DA4 is performed only in replacement/management area MA4 of the same rotation speed zone.

With this arrangement, the rotation speed of disk OD need not be switched during replacement. Therefore, replacement can be performed at a higher speed.

Figure 6:
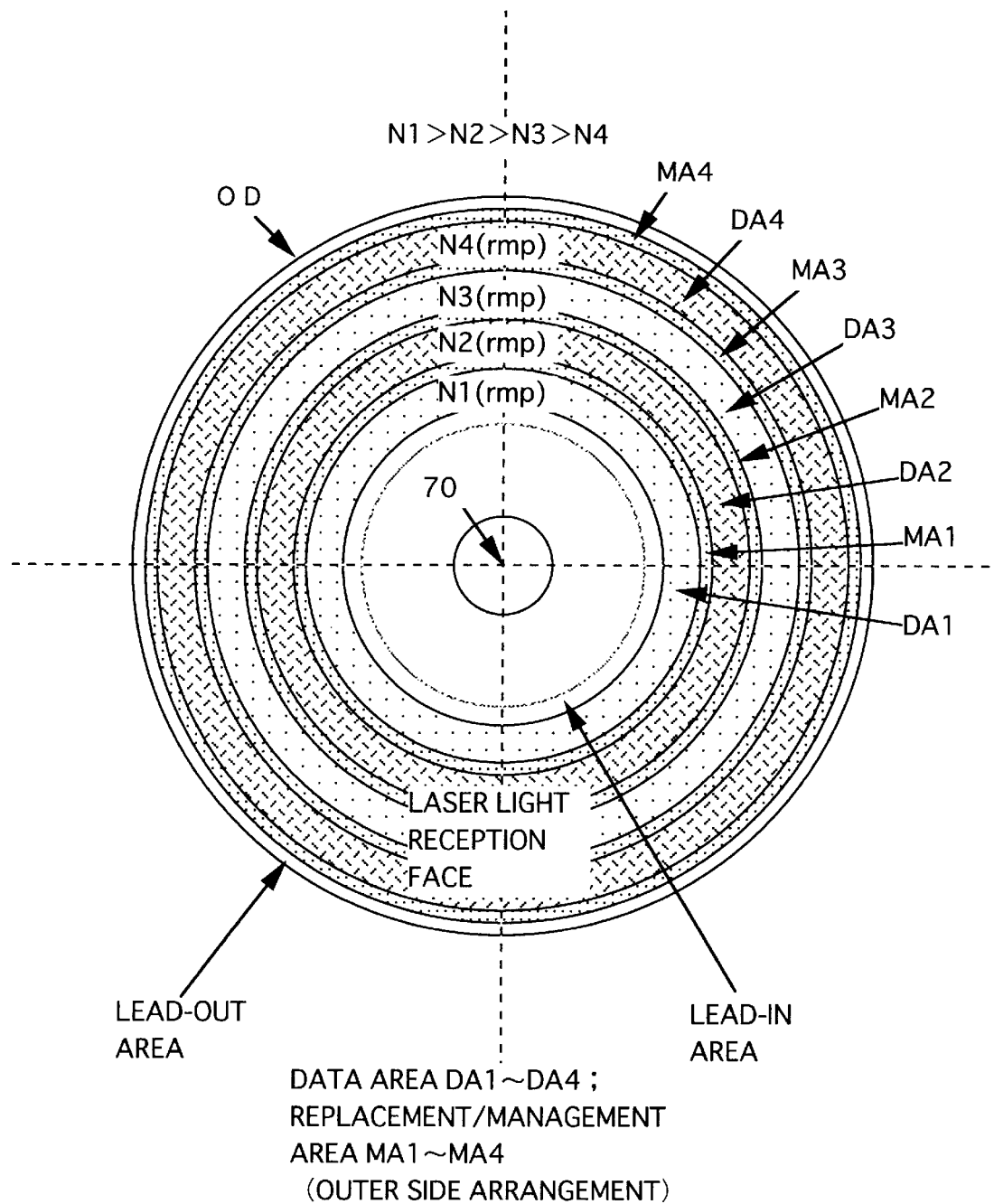
FIG. 6 is a view for explaining data track arrangement 2 (a replacement/management area is arranged on an outer side of each data area) of the double-layered optical disk shown in FIG. 4.

FIG. 6 is a view for explaining data track arrangement 2 (a replacement/management area is arranged outside each data area) of the double-layered optical disk shown in FIG. 4.

In this arrangement as well, replacement/management area MA1 whose rotation speed (rpm) is N1 is arranged spirally or concentrically with data area DA1 whose rotation speed is N1. In this case, replacement/management area MA1 is arranged on an outer side of the same rotation speed zone.

More specifically, replacement/management area MA1 with rotation speed N1 is arranged, on an outer side of data area DA1 with rotation speed N1, spirally or concentrically with data area DA1. Replacement/management area MA2 with rotation speed N2 is arranged spirally or concentrically with data area DA2 on an outer side of data area DA2. Replacement/management area MA3, with rotation speed N3, is arranged spirally or concentrically with data area DA3, with rotation speed N3, on an outer side of data area DA3. Replacement/management area MA4, with rotation speed N4, is arranged spirally or concentrically with data area DA4, with rotation speed N4, on an outer side of data DA4.

In this data area arrangement as well, the relation between the rotation speeds of the constant rotation zones is defined as N1>N2>N3>N4 to average the recording densities of the rotation zones (DA1+MA1; DA2+MA2; DA3+MA3; DA4+MA4), thereby ensuring a large recording capacity in the entire disk.

The number of data areas or replacement/management areas (the number of zones with constant rotation speeds) is set to four for descriptive convenience. However, the number of areas (the number of zones) may be larger, or the present invention can be practiced even with three or fewer zones.

When data is to be written in data area DA1 of optical disk OD having the structure shown in FIG. 6, management (management of the data write range in the data area DA1) is performed only in replacement/management area MA1 of the same rotation speed zone. Similarly, write management in data area DA2 is performed only in replacement/management area MA2 of the same rotation speed zone. Write management in data area DA3 is performed only in replacement/management area MA3 of the same rotation speed zone. Write management in data area DA4 is performed only in replacement/management area MA4 of the same rotation speed zone.

With this arrangement, the rotation speed of disk OD need not be switched during write management. Therefore, writing can be performed at a higher speed.

On the other hand, when data is to be read out from data area DA1 of optical disk OD having the structure shown in FIG. 6, management (management of the data read range in the data area DA1) is performed referring to only replacement/management area MA1 of the same rotation speed zone. Similarly, read management in data area DA2 is performed referring to only replacement/management area MA2 of the same rotation speed zone. Read management in data area DA3 is performed referring to only replacement/management area MA3 of the same rotation speed zone. Read management in data area DA4 is performed referring to only replacement/management area MA4 of the same rotation speed zone.

With this arrangement, the rotation speed of disk OD need not be switched during reading. Therefore, reading can be performed at a higher speed.

In addition, when a write error is generated in data area DA1 of optical disk OD having the structure shown in FIG. 6, replacement is performed only in replacement/management area MA1 of the same rotation speed zone. Similarly, replacement of a write error generated in data area DA2 is performed only in replacement/management area MA2 of the same rotation speed zone. Replacement of a write error generated in data area DA3 is performed only in replacement/management area MA3 of the same rotation speed zone. Replacement of a write error generated in data area DA4 is performed only in replacement/management area MA4 of the same rotation speed zone.

With this arrangement, the rotation speed of disk OD need not be switched during replacement. Therefore, replacement can be performed at a higher speed.

Figure 7:
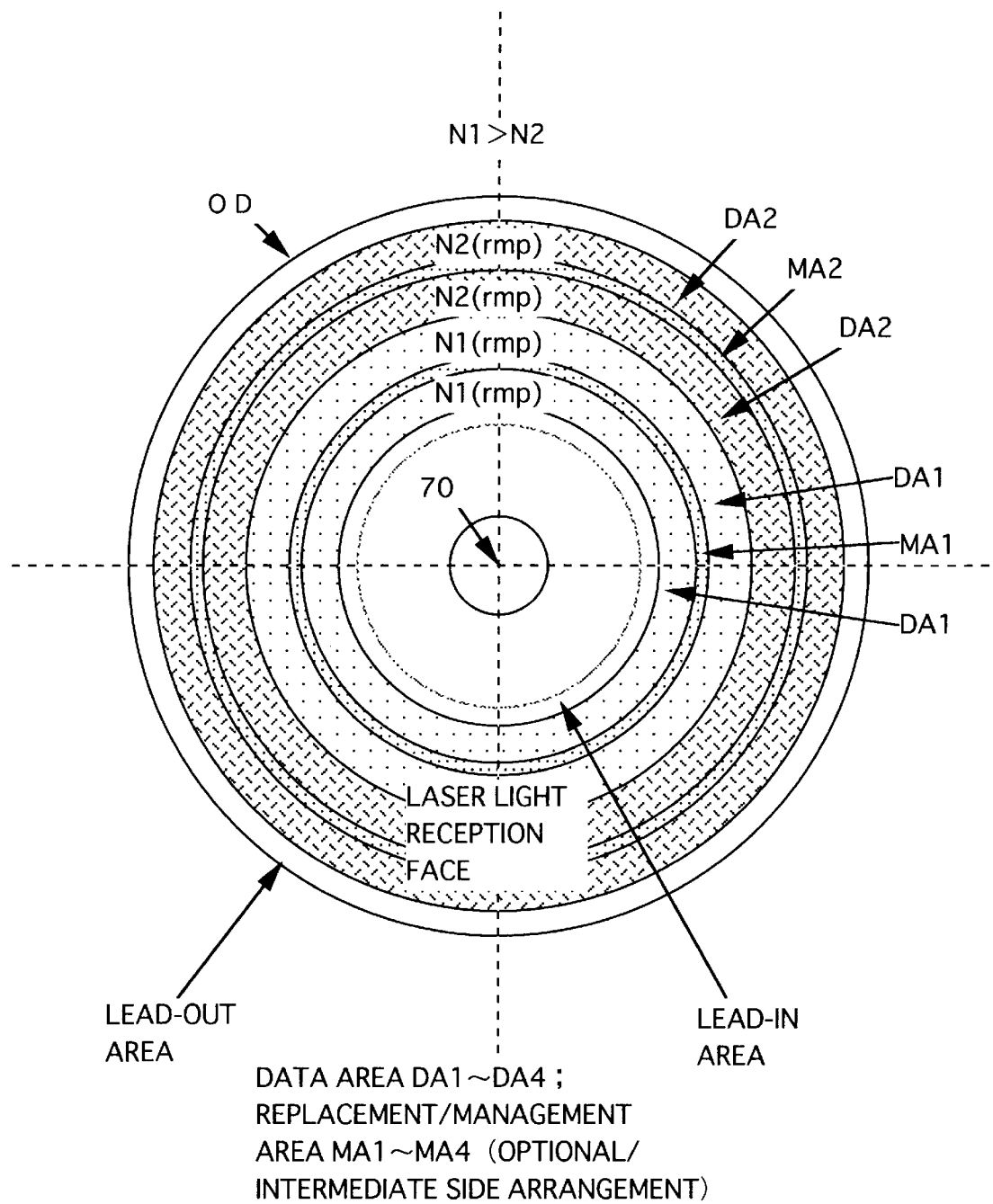
FIG. 7 is a view for explaining data track arrangement 3 (a replacement/management area is arranged at an intermediate position of each data area) of the double-layered optical disk shown in FIG. 4.

FIG. 7 is a view for explaining data track arrangement 3 (a replacement/management area is arranged at an intermediate position of each data area) of the double-layered optical disk shown in FIG. 4.

In this arrangement as well, replacement/management area MA1, with a rotation speed (rpm) of N1, is arranged spirally or concentrically with data area DA1, having a rotation speed of N1. In this case, replacement/management area MA1 is arranged at an intermediate position (optional position) of the same rotation speed zone.

More specifically, replacement/management area MA1 with rotation speed N1 is arranged, at an intermediate position of data area DA1 with rotation speed N1, spirally or concentrically with data area DA1 having a rotation speed of N2, at an Replacement/management area MA2, with rotation speed N2, is arranged spirally or concentrically with data area DA2 intermediate position of data area DA2.

In this data area arrangement as well, the relation between the rotation speeds of the constant rotation zones is defined as N1>N2 to average the recording densities of the rotation zones (DA1+MA1; DA2+MA2), thereby ensuring a large recording capacity in the entire disk.

The number of data areas or replacement/management areas (the number of zones with constant rotation speeds) is set to two for descriptive convenience. However, the number of areas (the number of zones) may be larger.

When data is to be written in data area DA1 of optical disk OD having the structure shown in FIG. 7, management (management of the data write range in the data area DA1) is performed only in replacement/management area MA1 of the same rotation speed zone. Similarly, write management in data area DA2 is performed only in replacement/management area MA2 of the same rotation speed zone.

With this arrangement, the rotation speed of disk OD need not be switched during write management. Therefore, writing can be performed at a higher speed.

On the other hand, when data is to be read out from data area DA1 of optical disk OD having the structure shown in FIG. 7, management (management of the data read range in the data area DA1) is performed referring to only replacement/management area MA1 of the same rotation speed zone. Similarly, read management in data area DA2 is performed referring to only replacement/management area MA2 of the same rotation speed zone.

With this arrangement, the rotation speed of disk OD need not be switched during reading. Therefore, reading can be performed at a higher speed.

In addition, when a write error is generated in data area DA1 of optical disk OD having the structure shown in FIG. 7, replacement is performed only in replacement/management area MA1 of the same rotation speed zone. Similarly, replacement of a write error generated in data area DA2 is performed only in replacement/management area MA2 of the same rotation speed zone.

With this arrangement, the rotation speed of disk OD need not be switched during replacement. Therefore, replacement can be performed at a higher speed.

Optical disk OD having an area pattern shown in FIG. 6 or 7 has no replacement/management area MA1 between the lead-in area and first data area DA1. In this case, once a disk reproducing apparatus (not shown) reads various disk content information from the lead-in area, data area DA1 can be immediately reproduced (the optical pickup need not jump replacement/management area MA). This is a large difference compared with the area pattern shown in FIG. 5.

In the area pattern shown in FIG. 6, data areas DA1 and DA3 may have the read only structure in FIG. 3, and data areas DA2 and DA4 may have the read/write structure in FIG. 4. In this case, replacement areas MA1 and MA2 may be arranged in the rotation speed N2 zone and used for replacement/management processing of data area DA2, and replacement areas MA3 and MA4 may be arranged in the rotation speed N4 zone and used for replacement/management processing of data area DA4.

FIG. 8 is a view for explaining the arrangement of data areas (DA1 to DA4) and replacement/management areas (MA1 to MA4) in units of track groups with the disk rotation speeds (N1 to N4) in an optical disk having the data track arrangement shown in FIG. 5 or 6.

For the descriptive convenience, each constant rotation zone comprises 100 tracks (#001 to #100; #101 to #200; #201 to #300; #301 to #400).

When the area pattern shown in FIG. 5 is to be employed, an arrangement shown in record map (1) of FIG. 8 is employed. More specifically, tracks with smaller numbers (#001 and #002 in the rotation speed N1 zone; #101 and #102 in the rotation speed N2 zone; #201 and #202 in the rotation speed N3 zone; #301 and #302 in the rotation speed N4 zone) are assigned to the replacement/management areas (MA1; MA2; MA3; MA4). Tracks with larger numbers (#003 to #100 in the rotation speed N1 zone; #103 to #200 in the rotation speed N2 zone; #203 to #300 in the rotation speed N3 zone; #303 to #400 in the rotation speed N4 zone) are assigned to the data areas (DA1;DA2; DA3; DA4).

When the area pattern shown in FIG. 6 is to be employed, an arrangement shown in record map (2) of FIG. 8 is employed. More specifically, tracks with smaller numbers (#001 to #098 in the rotation speed N1 zone; #101 and #198 in the rotation speed N2 zone; #201 to #298 in the rotation speed N3 zone; #301 to #398 in the rotation speed N4 zone) are assigned to the data areas (DA1; DA2; DA3; DA4). Tracks with larger numbers (#099 and #100 in the rotation speed N1 zone; #199 and #200 in the rotation speed N2 zone; #299 and #300 in the rotation speed N3 zone; #399 and #400 in the rotation speed N4 zone) are assigned to the replacement/management areas (MA1; MA2; MA3; MA4).

When the area pattern shown in FIG. 7 is to be employed, although not illustrated, for example, tracks #001 to #100 and tracks #111 to #200 may be assigned to data area DA1, and tracks #101 to #110 may be assigned to replacement/ management area MA1. Tracks #201 to #300 and tracks #311 to #400 may be assigned to data area DA2, and tracks #301 to #310 may be assigned to replacement/management area MA2.

The management area of a replacement/management area (MA1; MA2; MA3; MA4) is used for file system management of data recorded in the optical disk OD, recording/ reproducing condition management of the data, and the like. The contents of file system management and recording/ reproducing condition management are read out from the disk OD, and then stored in the memory of the host computer and managed by the host computer. The configuration of the file system depends on an operating system OS of a host computer.

For high-speed access to data recorded in the disk OD, information of the relation between a zone and an address on disk OD and the like must be known on the host computer side in advance. With this arrangement, proper disk access control can be performed as compared to a case in which the data recorded in disk OD is managed using only logical addresses.

The recording/reproducing conditions also depend on disk OD. Therefore, it is preferable to store the internal structure of disk OD in the memory of the host computer.

When the recording area of optical disk OD is divided into a plurality of zones, i.e., different zones such as a RAM zone (read/write zone), a ROM zone (read only zone), and an R zone (writable zone), recording/reproducing conditions can be managed in the following manner.

Information associated with all the RAM, ROM, and R zones are recorded in the management area of disk OD at once, and necessary processing is performed on the basis of the information. The following operation can be considered for disk OD having such a management area.

Defect information of the ROM and R zones are recorded in the management area of disk OD as defect information of the RAM zone. With this processing, a ROM or R zone portion in which the read precision degrades due to, e.g., flaws in disk OD to almost the error correction limit can be replaced with a RAM zone portion.

Systematic management in a partial disk having the RAM, ROM, and R zones can be performed in the following fashion. The RAM zone portion can take charge of all processing such as replacement, use frequency management, and use condition management.

Use frequency management will be described below. A ROM zone portion frequently used by the user of disk OD is stored in the memory (RAM) of the host computer. The host computer uses the stored information (as if it were a disk cache) to increase the access speed to the frequently used information in disk OD.

For use condition management, a password is set for information recorded in the ROM zone, and access to the information is disabled without the password. With this management, application distribution of the following form is enabled. Charged application software is stored in the ROM zone of disk OD. To use the application software, a charged password (key information) must be obtained (from the application distributer). In this case, the password information of the application whose use is permitted is stored in the RAM zone. With this arrangement, not a system using the independent RAM and (ROM) (and R) zones, but a system in which the respective zones are interlocked via the RAM zone is obtained.

FIG. 9 is a flow chart for explaining writing in the optical disk having the data track arrangement shown in FIG. 5 or 6 (The disk write apparatus can have a known arrangement and therefore is not illustrated. The processing of this flow chart can be executed by the system software or firmware of the disk write apparatus).

The "system for recording information onto disk medium" of Abiko (U.S. Pat. No. 4,835,757) issued on May 30, 1989 may be used to construct the above apparatus. All disclosures of this U.S. Patent are incorporated herewith.

Assume that optical disk OD shown in FIG. 6 is loaded in the disk write apparatus (not shown), and the user instructs data write access in any one of the data blocks of data area DA1.

The system software or firmware detects the data size of a file to be written (step ST30). When the write data size is detected, it is checked in all data areas (DA1 to DA4) whether there is a free space corresponding to the write data size (step ST32). If no free space exists, i.e., if the data size of the write file is larger than the actual free space (NO in step ST34), an error message is output (step ST46), and writing is ended.

If a free space exists (YES in step ST34), the file code of the write data and write start and stop block numbers are recorded at the management area (MA2) with the same rotation speed (N2) as the data area (e.g., DA2) having the free space (step ST36).

The data to be written in the management area may be a file code, a write start block number, and a file length (number of blocks to be used).

Assume that the free space is distributed in a plurality of data areas. For example, when data area DA1 has a free space of 900 kbytes, data area DA2 has no free space, data area DA3 has a free space of 1,600 kbytes, and data of 2,000 kbytes is to be written in this disk OD, management is performed in the following manner.

The system software or firmware of the write apparatus writes the first 900-kbyte data of the write data in the free space (900 kbytes) of data area DA1, and the remaining data of 1,100 kbytes of the write data in the free space (1,600 kbytes) of data area DA3. In this case, file code (1) of the write data and the write start and stop block numbers of the first 900-kbyte data of the write data are recorded in management area MA1. File code (2) of the write data and the write start and stop block numbers of the remaining 1,100-kbyte data of the write data are recorded in management area MA3.

When data area DA1 has a free space of 900 kbytes, data area DA2 has no free area, and data area DA3 has a free space of 2,200 kbytes, the data having a file size of 2,000 kbytes is not divided to data areas DA1 and DA3 but written in the free space (2,200 kbytes) of data area DA3. In this case, the management data (file code and write start and stop block numbers) is written only in management area MA3.

When processing in the management area (MA2) is completed, write data is fetched by a write buffer (not shown) in units of blocks (e.g., 2 kbytes) (step ST38), and the write data is written in the free space of the corresponding data area (DA2) in units of blocks (step ST40). At this time, interleaved processing may be performed to improve the error correction capability in the subsequent data read processing.

The data written in the data area (DA2) is certified in units of blocks in read-after-write processing. If an error is detected, write retry is appropriately performed. If an error is still detected, replacement is performed using the replacement area (MA2) with the same rotation speed (N2) (step ST42).

The above write/replacement processing is repeated until the write file data is completely written in the data area (DA2) (NO in step ST44). Upon completion of writing of the write file data (YES in step ST44), writing in FIG. 9 is ended.

When the size of the write data file is very large, and writing is performed in a plurality of data areas (e.g., DA2 and DA3), the management data is written in management area MA2 and/or MA3 (normally only MA2). For a write error generated in data area DA2, replacement is performed in replacement area MA2, and for a write error generated in data area DA3, replacement is performed in management area MA3.

FIG. 10 is a flow chart for explaining reading in the optical disk having the arrangement shown in FIG. 5 or 6.

When the user designates a read file name, the system software or firmware of a read apparatus (optical disk player) (not shown) searches for the designated read file in all management areas (MA1 to MA4) (step ST50). If the read file is not found (NO in step ST52), an error message is output (step ST66), and reading is ended.

If the read file is found (YES in step ST52), the start and stop block numbers (or the number of blocks to be used) of the read file are extracted from the management area (e.g., MA2) where the found file exists (step ST54).

As has been described in step ST36 of writing show n in FIG. 9, the read file data has been written in the data area (DA2) with the same rotation speed (N2) as the management area (MA2). The data is read out from the start block number position in the data area (DA2) in units of blocks (in units of 2 kbytes) (step ST56).

If an error is detected during data reading (YES in step ST58), error correction (ECC) processing is performed (step ST60) (if interleaved processing has been performed during writing, ECC processing with a high correction capability can be performed. If this correction processing fails (NO in step ST62), an error message is output (step ST66), and reading is ended. If the correction processing is successful (YES in step ST62), reading of the next data block is performed in a similar manner (NO in step ST64, steps ST56 to ST62).

If no error is detected during reading (NO in step ST58), steps ST60 to ST62 are skipped.

Upon completion of reading to the stop block number which is extracted in step ST54 (YES in step ST64), reading in FIG. 10 is ended.

FIG. 11 is a flow chart for explaining replacement performed when a write error is detected in the optical disk having the data track arrangement shown in FIG. 5 or 6 (The disk write apparatus can have a known arrangement and therefore is not illustrated. The processing of this flow chart can be executed by the system software or firmware of the disk write apparatus).

Assume that optical disk OD shown in FIG. 6 is loaded in the disk write apparatus (not shown), and the user instructs data write access in any one of the data blocks of data area DA1.

A data source (not shown) (e.g., a specific file on the hard disk) is fetched by the disk write apparatus in units of specific block units (e.g., in units of 2 kbytes) (step ST10). The fetched data is temporarily written in a buffer memory (not shown).

The fetched data is written in a data block (one of the blocks of data area DA1) which is designated by the firmware of the disk write apparatus (step ST12).

The written data is read out immediately after the write access and compared with the data written in the buffer memory. It is checked whether the data is correctly written (step ST14).

If the written data coincides with the readout data, it is determined that there is no write error (NO in step ST16). Otherwise, a write error is detected (YES in step ST16).

When the detected error exceeds an allowable degree and is not be negligible, and if re-try writing has not been performed yet at that time point (NO in step ST18), the data written in the buffer memory is written again in the error detection block (step ST20).

If, for the data which has undergone retry writing (step ST20), a write error is detected again (YES in step ST16), the error detection block is determined as a defective block because the write access has already been retried (YES in step ST18) (this defective block is stored by the firmware or system software of the disk write apparatus and not used for write access anymore).

Upon determining the defective block, replacement is performed (step ST22). More specifically, the write data in the buffer memory for which retry has failed is written in a free block (known by the firmware or system software of the disk write apparatus) of replacement/management area MA1 with the same rotation speed of, i.e., N1, of data area DA1 where the defective block is detected.

The above processing (steps ST10 to ST22) is executed for all data files to be written in disk OD. When write of all these data files is completed (YES step ST24), processing in FIG. 11 is ended.

The above description can be applied to any of data areas DA2 to DA4 and replacement/management areas MA2 to MA4 shown in FIG. 6.

The processing in FIG. 11 has been described for disk OD in FIG. 6, although it can also be applied to disk OD in FIG. 5 or 7.

To improve the read reliability of the data written in disk OD, the backup data of management areas MA1 to MA4 may be recorded in a management data backup area (not shown) (in FIG. 5, this backup area can be formed outside data area DA4). When disk OD having this backup area is loaded in a read apparatus (not shown), the system software or firmware of the apparatus compares the management data stored in the backup area with the management data of distributed management areas MA1 to MA4. If the management data coincide with each other, no problem is posed. Otherwise, the contents of management areas MA1 to MA4 can be repaired using the management data in the backup area.

When the user performs a file read operation in data reading after writing, the firmware or system software of the disk write apparatus reads out the management data of the read data in data area DA1 from corresponding management area MA1. Since the rotation speed of disk OD remains N1, reading is performed at a high speed.

Figure 12:
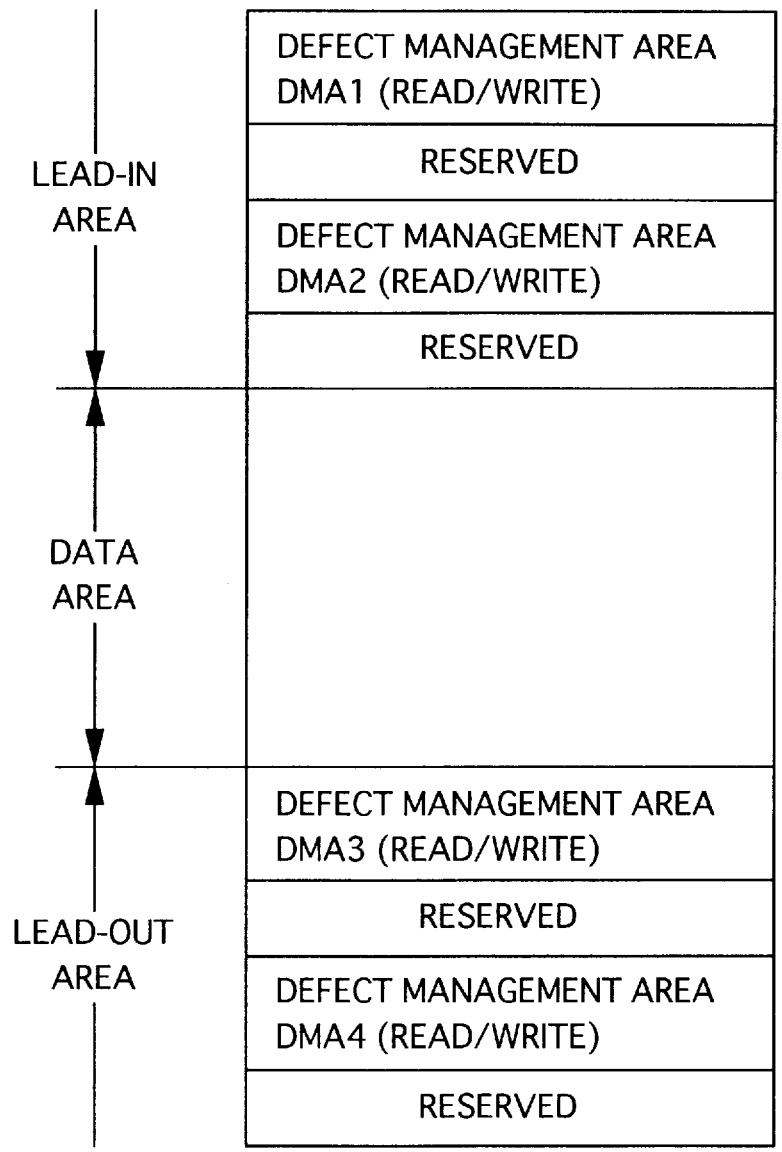
FIG. 12 shows the configurations of the lead-in area (inner side) and lead-out area (outer side) of the optical disk of FIG. 1, and the data area between the lead-in and lead-out areas.

FIG. 12 shows the configurations of the lead-in area (inner side) and lead-out area (outer side) of the optical disk of FIG. 1, and the data area between the lead-in and lead-out areas.

[Defect Management Areas (DMAs)]

The lead-in area at the inner side of optical disk OD is provided with a plurality of defect management areas DMA1 and DMA2 as well as reserved areas. Similarly, the lead-out area at the outer side of optical disk OD is provided with a plurality of defect management areas DMA3 and DMA4 as well as other reserved areas. Data area is provided between the lead-in and lead-out areas.

Four defect management areas DMA1–DMA4 contain information on the structure of the data area and on the defect management. The length of each defect management area DMA (DMA1–DMA4) shall be 32 sectors. Each data management area DMA is followed by two blocks of reserved sectors.

Each data management area DMA shall consist of two ECC blocks followed by two reserved blocks.

A disk definition structure (DDS) and a primary defect list (PDL) shall be contained in the first ECC block of each DMA (DDS/PDL block). A secondary defect list (SDL) shall be contained in the second ECC block of each DMA (SDL block). The contents of four PDLs of the four DMAs (DMA1–DMA4) shall be identical and the contents of four SDLs thereof shall be identical. The only differences between the contents of four DDSs shall be the pointers to each associated PDL and SDL.

Here, DDS/PDL block means the ECC block containing the DDS and PDL. SDL block means the ECC block containing the SDL.

After initialization of optical disk OD, each defect management area DMA shall have the following content:

(1) The first sector of each DDS/PDL block shall contain the DDS.

(2) The second sector of each DDS/PDL block shall be the first sector of the PDL.

(3) The first sector of each SDL block shall be the first sector of the SDL.

The lengths of the PDL and SDL are determined by the number of entries in each. Unused sectors in respective DMAs shall be filled with 0FFh.

[Disk Definition Structure (DDS)]

The disk definition structure DDS shall consist of a table with a length of one sector. The DDS specifies the method of initialization of the disk and the start address of the PDL and SDL. The DDS shall be recorded in the first sector of each defect management area DMA at the end of initialization of the disk.

[Partitioning]

During initialization of disk OD, the data area shall be partitioned into 24 consecutive groups. Each group shall span one complete zone excluding the buffer blocks.

The buffer blocks are allocated at the beginning and at the ending of each zone with the exception of the beginning of zone 0 and the ending of zone 23.

Each group shall comprise full blocks of data sectors followed by full block of spare sectors.

[Spare Sectors]

Defective sectors in the data area shall be replaced by good sectors according to the defect management method (including certification, slipping replacement, and linear replacement which are described later) of the present invention. The total number of spare blocks shall not be greater than 4087.

Disk OD shall be initialized before use. The DVD system allows initialization with or without certification.

Defective sectors are handled by a Slipping Replacement Algorithm or by a Linear Replacement Algorithm. The total number of entries, listed in the primary defect list (PDL) and the secondary defect list (SDL), by both of the above algorithms shall not be greater than 4092.

[Initialization of Disk]

During the initialization of disk OD, the four defect management areas (DMA1–DMA4; or DMAs) are recorded prior to the first use of disk OD. The data area shall be partitioned into 24 groups. Each group shall contain a number of full blocks for data sectors followed by a number of spare sectors. The spare sectors can be used as replacements for defective data sectors. Initialization can include a certification of the groups whereby defective sectors are identified and skipped.

All disk definition structure (DDS) parameters shall be recorded in the four DDS sectors. The primary defect list (PDL) and secondary defect list (SDL) shall be recorded in the four defect management areas (DMAs). In the case of the first initialization, an update counter in the SDL shall be set to 00h. All reserved blocks shall be filled with 00h.

[Certification SDL]

If disk OD is certified, the certification shall be applied to the data sectors and to the spare sectors in the groups. The certification may involve writing and reading of the sectors in the groups.

Defective sectors found during certification shall be handled by the slipping replacement algorithm. Defective sectors shall not be used for reading and writing.

A case wherein the spare sectors in a zone of disk OD are exhausted during certification shall be regarded as an error. Such disk OD shall not be used further.

[Slipping Replacement Algorithm]

The slipping replacement algorithm shall be applied individually to each and every group in the data area when certification is performed.

A defective data sector found during certification shall be replaced by the first good sector following the defective sector, to thereby cause a slip of one sector towards the end of the group. The last data sector will slip into the spare sector area of the group.

The address of the defective sector is written in the PDL. The defective sector shall not be used for recording user data. If no defective sectors are found during certification, an empty PDL is recorded.

The addresses of spare sectors, beyond the last data sector slipped into the spare area (if any), which are found to be defective during certification, shall be recorded in the PDL. Thus, the number of available spare sectors is diminished or decreased accordingly.

If the spare sector area of a group becomes exhausted during certification, the certification shall be regarded as a failure.

[Linear Replacement Algorithm]

The linear replacement algorithm is used to handle both defective sectors and sectors deteriorated by overwrite cycles found after certification. The replacement shall be performed in a unit of 16 sectors, viz. a block (or in a unit of 32k bytes when one sector is formed of 2k bytes).

The defective block shall be replaced by the first available good spare block of the group. If there are no spare blocks left in the group, viz. there are less than 16 sectors left in the group, this fact shall be recorded in the SDL, and the defective block shall be replaced by the first available good spare block of another group. The address of the defective block and the address of its last replacement block shall be recorded in the SDL.

The indication that there are no spare blocks left in the group shall be recorded in the SDL. Bit 0 of byte 29 when set to "1" indicates that there are no spare blocks left in group 0. When set to "0", this bit indicates that there are still spare blocks left in group 0. Bit 0 of byte 29 corresponds to group 0, bit 1 of byte 29 corresponds to group 1, bit 0 of byte 28 corresponds to group 8, and so on.

If a data block is found to be defective after certification, it shall be regarded as a defective block and it shall be listed in the SDL with a new entry.

If a replacement block listed in the SDL is later found to be defective, a direct pointer method shall be applied for a registration into the SDL. In the direct pointer method, the SDL entry in which the defective replaced block has been registered shall be modified by changing the address of the replacement block from the defective one to a new one.

At the time of updating the SDL, an update counter in the SDL shall be incremented by one.

[Disks not Certified]

The linear replacement algorithm is also used to handle the sectors found defective on the disks which have not been certified. The replacement shall be performed in a unit of 16 sectors, viz. one block.

A defective block shall be replaced by the first available good spare block of the group. If there are no spare blocks left in the group, this fact shall be recorded in the SDL, and the defective block shall be replaced by the first available good spare block of another group. The address of the defective block and the address of its last replacement block shall be recorded in the SDL.

The indication that there are no spare blocks left in the group shall be recorded in the SDL. Bit 0 of byte 29 when set to "1" indicates that there are no spare blocks left in group 0. When set to "0", this bit indicates that there are still spare blocks left in group 0. Bit 0 of byte 29 corresponds to group 0, bit 1 of byte 29 corresponds to group 1, bit 0 of byte 28 corresponds to group 8, and so on.

If there exists a list of addresses of the defective sectors in the PDL, these sectors shall be skipped for use even if the disks are not certified. This process is the same as the process for the certified disks.

[Write Procedure]

When writing data in the sectors of a group, a defective sector listed in the PDL shall be skipped, and the data shall be written in the next data sector, according to the slipping replacement algorithm. If a block to be written is listed in the SDL, the data shall be written in the spare block pointed to by the SDL, according to the linear replacement algorithm.

[Primary Defect List (PDL)]

A PDL shall always be recorded though it may be empty.

A list of defective sectors may be obtained by means other than certification of the disk.

The PDL shall contain the addresses of all defective sectors identified at initialization. The addresses shall be listed in ascending order. The PDL shall be recorded in the minimum number of sectors necessary, and it shall begin in the first user data byte of the first sector. All unused bytes of the last sector of the PDL shall be set to 0FFh.

Contents of the PDL are as follows:

| Byte | PDL content |
|---|---|
| 0 | 00h, PDL Identifier |
| 1 | 01h, PDL Identifier |
| 2 | Number of Addresses in the PDL, MSB |
| 3 | Number of Addresses in the PDL, LSB |
| 4 | Address of the First Defective Sector (Sector Number, MSB) |
| 5 | Address of the First Defective Sector (Sector Number) |
| 6 | Address of the First Defective Sector (Sector Number) |
| 7 | Address of the First Defective Sector (Sector Number, LSB) |
| . | . |
| . | . |
| . | . |
| x-3 | Address of the Last Defective Sector (Sector Number, MSB) |
| x-2 | Address of the Last Defective Sector (Sector Number) |
| x-1 | Address of the Last Defective Sector (Sector Number) |
| x | Address of the Last Defective Sector (Sector Number, LSB) |

Note that if bytes 2 and 3 are set to 00h, byte 3 is the end of the PDL.

In the case of multiple-sector PDL, the list of addresses of the defective sectors shall continue with the first byte of the second and subsequent sectors. Thus, the PDL Identifier and the Number of Addresses of the PDL shall be present only in the first sector.

In an empty PDL, bytes 2 and 3 shall be set to 00h and bytes 4 to 2047 shall be set to FFh.

All unused sectors in the DDS/PDL block shall be recorded with "FFh" data.

[Secondary Defect List (SDL)]

The secondary defect list (SDL) is created during initialization and used after certification. All disks shall have an SDL recorded during initialization.

The SDL shall contain entries in the form of addresses of defective data blocks and addresses of the spare blocks which replace them. Each entry in the SDL contains 8 bytes; four bytes are provided for the address of a defective block and another four bytes are provided for the address of its replacement block.

The list of addresses shall contain the first addresses of the defective blocks and their replacement blocks. The addresses of the defective blocks shall be in ascending order.

The SDL shall be recorded in the minimum number of sectors necessary, and it shall begin in the first user data byte of the first sector. All unused bytes of the last sectors of the SDL shall be set to 0FFh. The following (subsequent) information shall be recorded in each of the four SDLs.

If a replacement block listed in the SDL is later found to be defective, a direct pointer method shall be applied for a registration into the SDL. In this method, the SDL entry in which the defective replaced block has been registered shall be modified by changing the address of the replacement block from the defective replaced block to a new one. Therefore, the number of entries in the SDL shall remain unchanged by deteriorated sectors.

| Byte | SDL content |
|---|---|
| 0 | (00), SDL Identifier |
| 1 | (02), SDL Identifier |
| 2 | (00) |
| 3 | (01) |
| 4 | Update counter, MSB |
| 5 | Update counter |
| 6 | Update counter |
| 7 | Update counter, LSB |
| 8 to 26 | Reserved (00h) |
| 27 to 29 | Flags indicating that all spare sectors of a zone have been used. |
| 30 | Number of Entries in the SDL, MSB |
| 31 | Number of Entries in the SDL, LSB |
| 32 | Address of the First Defective Block (Sector Number, MSB) |
| 33 | Address of the First Defective Block (Sector Number) |
| 34 | Address of the First Defective Block (Sector Number) |
| 35 | Address of the First Defective Block (Sector Number, LSB) |
| 36 | Address of the First Replacement Block (Sector Number, MSB) |
| 37 | Address of the First Replacement Block (Sector Number) |
| 38 | Address of the First Replacement Block (Sector Number) |
| 39 | Address of the First Replacement Block (Sector Number, LSB) |
| . | . |
| . | . |
| . | . |
| y-7 | Address of the Last Defective Block (Sector Number, MSB) |
| x-6 | Address of the Last Defective Block (Sector Number) |
| y-5 | Address of the Last Defective Block (Sector Number) |
| y-4 | Address of the Last Defective Block (Sector Number, LSB) |
| y-3 | Address of the Last Replacement Block (Sector Number, MSB) |
| x-2 | Address of the Last Replacement Block (Sector Number) |
| y-1 | Address of the Last Replacement Block (Sector Number) |
| y | Address of the Last Replacement Block (Sector Number, LSB) |

The number of entries is located in 2 bytes, byte 30 and byte 31.

In the case of multiple-sector SDL, the list of addresses of the defective and of replacement blocks shall continue with the first byte of the second and subsequent sectors. Thus, the contents of bytes 0 to 31 in the above shall be present only in the first sector.

All unused sectors in the SDL block shall be recorded with "FFh" data.

Figure 13:
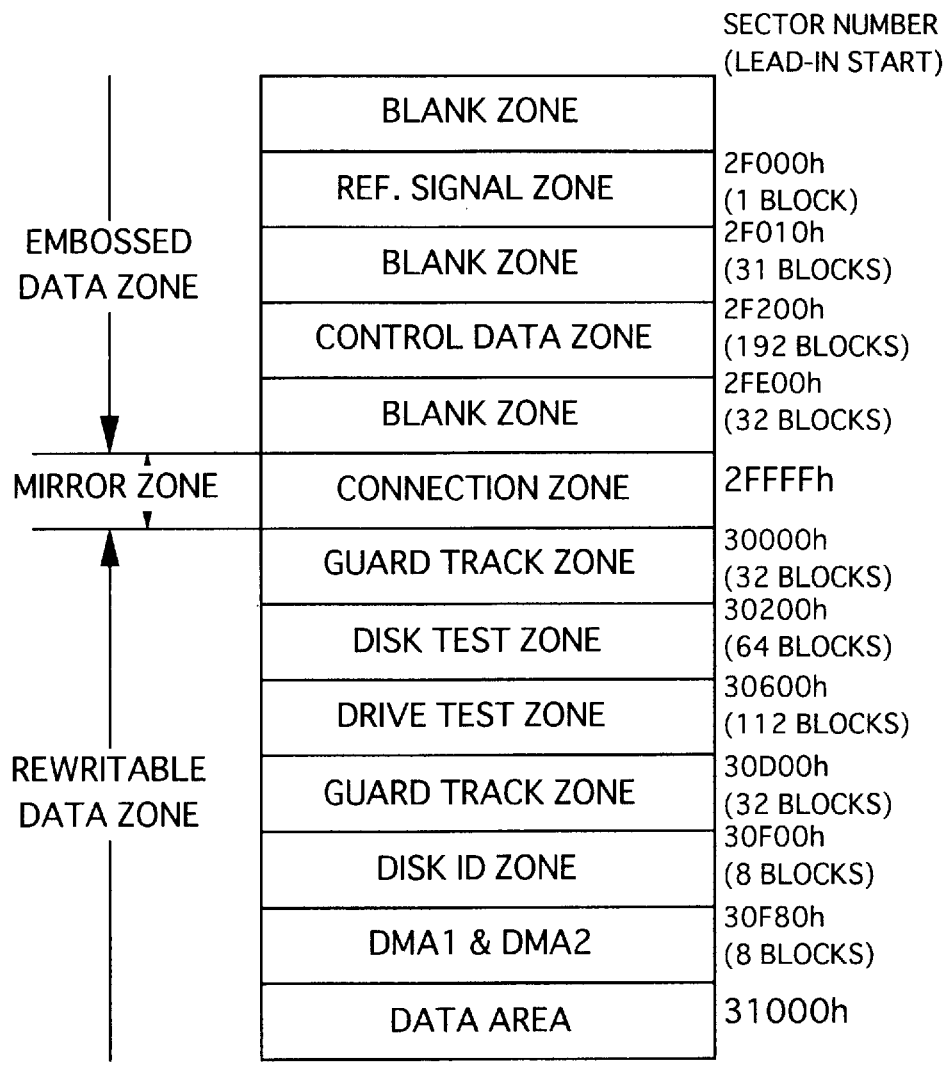
FIG. 13 explains the configuration of the lead-in area of FIG. 12.

The lead-in area of FIG. 12 is constituted as shown in FIG. 13. Thus, the lead-in area is formed of an embossed data zone, a mirror zone, and a rewritable data zone.

The embossed data zone includes a plurality of blank zones, a reference signal zone, and a control data zone. The mirror zone includes a connection zone. The rewritable data zone includes guard track zones, a disk test zone, a drive test zone, a disk ID zone, defect management areas DMA1 and DMA2, and a data area.

[Blank Zone]

The blank zone shall contain embossed data fields. These data fields shall contain embossed data (00h).

[Reference Signal Zone]

The reference signal zone shall contain embossed data fields. These data fields shall contain embossed data of a reference code. The reference code is comprised of one ECC block (16 sectors) starting from the sector number 192512 (2F000h) in the lead-in area.

Each sector's main data of 2048 bytes (2k bytes) is defined according to the following manner. First, the sector's main data of 2048 bytes (D0 to D2047) which repeat the data symbol "172" is produced. Then, the reference code for 16 sectors is produced by adding scramble data to the sector's main data. More specifically, the scramble data of the initial preset number '0' is added to the sector's main data. However, as to the part D0 to D159 of sector 0, the scramble data is masked and the addition of scramble data is not carried out.

[Control Data Zone]

The control data zone shall contain embossed data fields. These data fields shall contain embossed data of control data. The control data is comprised of the 192 ECC blocks starting from the sector number 193024 (2F200h) in the lead-in area. The content of 16 sectors in each block, as shown in FIG. 14, is repeated 192 times.

As shown in FIG. 14, each said block contains physical format information at relative sector number 0, disk manufacturing information at relative sector number 1, and contents provider information at relative sector numbers 2 to 15.

[Physical Format Information]

FIG. 15 shows the configuration of the physical format information of FIG. 14.

At byte 0 of the physical format information of FIG. 15, book type and part version information (1 byte) is written as shown in FIG. 16.

At byte 1 of the physical format information of FIG. 15, disk size and minimum read out rate information (1 byte) is written as shown in FIG. 17.

At byte 2 of the physical format information of FIG. 15, disk structure information (1 byte) is written as shown in FIG. 18. First to fourth bits (b0 to b3) of this information are used to describe the layer type of the recording layer; fifth bit (b4) is used to describe the track path; sixth to seventh bits (b5 and b6) are used to indicate the number of the recording layers; and the eighth bit (b7) is provided for reservation.

At byte 3 of the physical format information of FIG. 15, recorded density information (1 byte) is written as shown in FIG. 19. First to fourth bits (b0 to b3) of this information are used to describe the track density; and fifth to eighth bits (b4 to b7) thereof are used to describe the linear density.

Figures 20, 21:
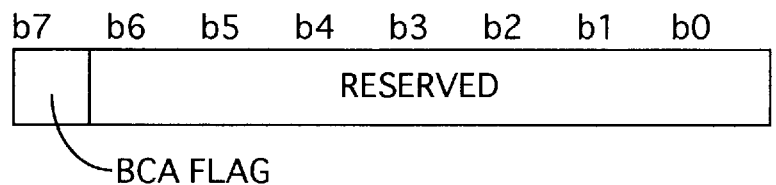
FIG. 20 explains the data structure of the "data area allocation" of FIG. 15.
FIG. 21 explains the data structure of the "burst cutting area (BCA) descriptor" of FIG. 15.

At bytes 4 to 15 of the physical format information of FIG. 15, data area allocation information (12 bytes) is written as shown in FIG. 20. Fifth to seventh bytes of this information are used to describe the start sector number of the data area, and ninth to eleventh bytes thereof are used to describe the end sector number of the data area.

At byte 16 of the physical format information of FIG. 15, information (1 byte) of a burst cutting area (BCA) descriptor is written as shown in FIG. 21. The first to seventh bits (b0 to b6) of this information are reserved and the eighth bit (b7) thereof is used to describe a BCA flag indicating whether the BCA exists or not.

The 17th to 31st bytes of the physical format information of FIG. 15 are reserved.

Figure 22:
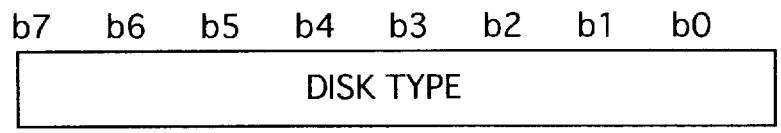
FIG. 22 explains the data structure of the "disk type identification (ID)" of FIG. 15.

At byte 32 of the physical format information of FIG. 15, disk type ID information (1 byte) is written as shown in FIG. 22. When this information is 000000000b, it is indicated that the disk is a read-only disk without a case or housing. ID=001000b of this information is reserved for identifying a read/write disk without a case/housing.

The 33rd to 47th bytes of the physical format information of FIG. 15 are reserved.

Figure 23:
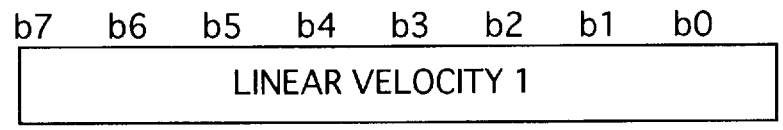
FIG. 23 explains the data structure of the "velocity 1" of FIG. 15.

At byte 48 of the physical format information of FIG. 15, data of velocity 1 (1 byte) is written as shown in FIG. 23. This data byte shall define the center linear velocity for using the disk. For instance, when this data is 00111100b, this linear velocity is 6.0 m/s. Actual linear velocity shall be specified as:

Actual linear velocity=value (decimal content of the data byte)×0.1 m/s.

At byte 49 of the physical format information of FIG. 15, data representing the read power at velocity 1 (1 byte) is written as shown in FIG. 24. This data byte shall define the read power on the surface of the disk for playing at linear velocity 1. For instance, when this data is 00001010b, this read power is 1.0 mW. Actual read power shall be specified as:

Actual read power=value (decimal content of the data byte)×0.1 mW.

At byte 50 of the physical format information of FIG. 15, data representing the peak power on the land track at velocity 1 (1 byte) is written as shown in FIG. 25. This data byte shall specify the peak power on the surface of the disk for recording at linear velocity 1. For instance, when this data is 01101001b, this peak power is 10.5 mW. Actual peak power shall be specified as:

Actual peak power=value (decimal content of the data byte)×0.1 mW.

At byte 51 of the physical format information of FIG. 15, data representing the bias power 1 on the land track at velocity 1 (1 byte) is written as shown in FIG. 26. This data byte shall specify the bias power 1 on the surface of the disk for recording on the land track at linear velocity 1. For instance, when this data is 00101101b, the bias power 1 is 4.5 mW. Actual bias power 1 shall be specified as:

Actual bias power 1=value (decimal content of the data byte)×0.1 mW.

At byte 52 of the physical format information of FIG. 15, data reprsenting the first pulse starting time on the land track at velocity 1 (1 byte) is written as shown in FIG. 27. This data comprises a direction bit (eighth bit b7) and starting time bits (first to seventh bits b0 to b6) which indicate the first pulse starting time on the land track at linear velocity 1. When the eighth bit b7 is 0b, the first pulse has the same direction as the laser spot scanning. When the eighth bit b7 is 1b, the first pulse has the opposite direction as the laser spot scanning. The starting time data of first to seventh bits b0 to b6 shall specify the first pulse starting time (TSFP) for recording on the land track at linear velocity 1. For instance, when these bits (b0 to b6) are 0010001b, this starting time is 17 ns (TW/2). Actual starting time shall be specified as:

Actual starting time=value (decimal content of the data byte)×1 ns.

At byte 53 of the physical format information of FIG. 15, data representing the first pulse ending time on the land track at velocity 1 (1 byte) is written as shown in FIG. 28. This data byte shall specify the first pulse ending time (TEFP) for recording on the land track at linear velocity 1. For instance, when data is 00110011b, this ending time is 51 ns (3TW/2). Actual ending time shall be specified as:

Actual ending time=value (decimal content of the data byte)×1 ns.

At byte 54 of the physical format information of FIG. 15, data representing the multi-pulse duration on the land track at velocity 1 (1 byte) is written as shown in FIG. 29. This data byte shall specify multi-pulse duration (TMP) for recording on the land track at linear velocity 1. For instance, when data is 00010001b, this duration time is 17 ns (TW/2). Actual duration time shall be specified as:

Actual duration time=value (decimal content of the data byte)×1 ns.

At byte 55 the physical format information of FIG. 15, data representing the last pulse starting time on the land track at velocity 1 (1 byte) is written as shown in FIG. 30. This data comprises a direction bit (eighth bit b7) and starting time bits (first to seventh bits b0 to b6) which indicate the last pulse starting time on the land track at linear velocity 1. When the eighth bit b7 is 0b, the last pulse has the same direction as the laser spot scanning. When eighth bit b7 is 1b, the last pulse has the opposite direction as the laser spot scanning. The starting time data of first to seventh bits b0 to b6 shall specify the last pulse starting time (TSLP) for recording on the land track at linear velocity 1. For instance, when these bits (b0 to b6) are 0000000b, this starting time is 0 ns. Actual starting time shall be specified as:

Actual starting time=value (decimal content of the data byte)×1 ns.

At byte 56 of the physical format information of FIG. 15, data representing the last pulse ending time on the land track at velocity 1 (1 byte) is written as shown in FIG. 31. This data byte shall specify the last pulse ending time (TELP) for recording on the land track at linear velocity 1. For instance, when the data is 00100010b, this ending time is 34 ns (TW). Actual ending time shall be specified as:

Actual ending time=value (decimal content of the data byte)×1 ns.

At byte 57 of the physical format information of FIG. 15, data representing the bias power 2 duration on the land track at velocity 1 (1 byte) is written as shown in FIG. 32. This data byte shall specify the bias power 2 duration (TLE) for recording on the land track at linear velocity 1. For instance, when the data is 01000100b, this duration time is 68 ns (2TW). Actual duration time shall be specified as:

Actual duration time=value (decimal content of the data byte)×1 ns.

At byte 58 of the physical format information of FIG. 15, data representing the peak power on the groove track at velocity 1 (1 byte) is written as shown in FIG. 33. This data byte shall specify the peak power on the surface of the disk for recording on the groove track at linear velocity 1. For instance, when the data is 01101001b, this peak power is 10.5 mW. Actual peak power shall be specified as:

Actual peak power=value (decimal content of the data byte)×0.1 mW.

At byte 59 of the physical format information of FIG. 15, data representing the bias power 1 on the groove track at velocity 1 (1 byte) is written as shown in FIG. 34. This data byte shall specify the bias power 1 on the surface of the disk for recording on the groove track at linear velocity 1. For instance, when the data is 00101101b, this bias power 1 is 4.5 mW. Actual bias power 1 shall be specified as:

Actual bias power 1=value (decimal content of the data byte)×0.1 mW.

At byte 60 of the physical format information of FIG. 15, data representing the first pulse starting time on the groove track at velocity 1 (1 byte) is written as shown in FIG. 35. This data comprises a direction bit (eighth bit b7) and starting time bits (first to seventh bits b0 to b6) which indicate the first pulse starting time on the groove track at linear velocity 1. When eighth bit b7 is 0b, the first pulse has the same direction as the laser spot scanning. When eighth bit b7 is 1b, the first pulse has the opposite direction as the laser spot scanning. The starting time data of first to seventh bits b0 to b6 shall specify the first pulse starting time (TSFP) for recording on the groove track at linear velocity 1. For instance, when these bits (b0 to b6) are 0010001b, this starting time is 17 ns (TW/2). Actual starting time shall be specified as:

Actual starting time=value (decimal content of the data byte)×1 ns.

At byte 61 of the physical format information of FIG. 15, data representing the first pulse ending time on the groove track at velocity 1 (1 byte) is written as shown in FIG. 36. This data byte shall specify the first pulse ending time (TEFP) for recording on the groove track at linear velocity 1. For instance, when the data is 00110011b, this ending time is 51 ns (3TW/2). Actual ending time shall be specified as:

Actual ending time=value (decimal content of the data byte)×1 ns.

At byte 62 of the physical format information of FIG. 15, data representing the multi-pulse duration on the groove track at velocity 1 (1 byte) is written as shown in FIG. 37. This data byte shall specify the multi-pulse duration (TMP) for recording on the groove track at linear velocity 1. For instance, when data is 00010001b, this duration time is 17 ns (TW/2). Actual duration time shall be specified as:

Actual duration time=value (decimal content of the data byte)×1 ns.

At byte 63 of the physical format information of FIG. 15, data of last pulse starting time on the groove track at velocity 1 (1 byte) is written as shown in FIG. 38. This data comprises a direction bit (eighth bit b7) and starting time bits (first to seventh bits b0 to b6) which indicate the last pulse starting time on the groove track at linear velocity 1. When the eighth bit b7 is 0b, the last pulse has the same direction to the laser spot scanning. When eighth bit b7 is 1b, the last pulse has the opposite direction as the laser spot scanning. The starting time data of first to seventh bits b0 to b6 shall specify the last pulse starting time (TSLP) for recording on the groove track at linear velocity 1. For instance, when these bits (b0 to b6) are 0000000b, this starting time is 0 ns. Actual starting time shall be specified as:

Actual starting time=value (decimal content of the data byte)×1 ns.

At byte 64 of the physical format information of FIG. 15, data representing the last pulse ending time on the groove track at velocity 1 (1 byte) is written as shown in FIG. 39. This data byte shall specify last pulse ending time (TELP) for recording on the groove track at linear velocity 1. For instance, when the data is 00100010b, this ending time is 34 ns (TW). Actual ending time shall be specified as:

Actual ending time=value (decimal content of the data byte)×1 ns.

At byte 65 of the physical format information of FIG. 15, data representing the bias power 2 duration on the groove track at velocity 1 (1 byte) is written as shown in FIG. 40. This data byte shall specify the bias power 2 duration (TLE) for recording on the groove track at linear velocity 1. For instance, when the data is 01000100b, this duration time is 68 ns (2TW). Actual duration time shall be specified as:

Actual duration time=value (decimal content of the data byte)×1 ns.

Bytes 66 to 479 of the physical format information of FIG. 15 are reserved for write conditions at velocities V2 to V24. All of these bytes shall be set to 00h.

Bytes 480 to 2047 of the physical format information of FIG. 15 are reserved. All of these bytes shall be set to 00h.

The data block containing the above-mentioned physical format information contents (FIGS. 15–41) is stored in the control data zone of FIG. 13, and the control data zone is arranged at the lead-in area of FIG. 12. The lead-in area is allocated at the inner side of information recording layer 10 of disk OD. Data read/write operations for respective disks can be suitably performed with reference to the physical format information contents recorded at the lead-in area of disk OD.

The control data zone having said physical format information contents can be provided on all of or part of areas MA1 to MA4 of FIG. 5 or FIG. 6.

Suppose that data reading after data writing on the disk of FIG. 1 is performed. When a user performs a file reading operation, the firmware or system software of a disk write apparatus reads the management data of read data in data area DA1 from the corresponding management area MA1. At this time since the rotation speed of disk OD is not changed and kept at N1, the data read processing can be done quickly.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. An information recording disk arranged to be rotated at a plurality of rotation speeds such that information is recorded in a first area of a plurality of areas on said information recording disk when said information recording disk is being rotated at a predetermined rotation speed, each area of said plurality of areas being arranged to be accessed when said information recording disk is rotated at a corresponding rotation speed being different from a corresponding rotation speed of any other area of said plurality of areas, said information recording disk comprising:

said first area of said plurality of areas comprising:

a predetermined data area formed spirally or concentrically with a center of rotation of said information recording disk, in which said information is recorded when said information recording disk is being rotated at said predetermined rotation speed, and a predetermined management area formed spirally or concentrically with said center of rotation of said information recording disk on a side closer to said center of rotation of said information recording disk than said predetermined data area, in which management information associated with writing is recorded when writing is to be performed in said predetermined data area during rotation of said information recording disk at said predetermined rotation speed.

2. An information recording disk arranged to be rotated at a plurality of rotation speeds such that information is recorded in a first area of a plurality of areas on said information recording disk when said information recording disk is being rotated at a first rotation speed, each area of said plurality of areas being arranged to be accessed when said information recording disk is rotated at a corresponding rotation speed being different from a corresponding rotation speed of any other area of said plurality of areas, said information recording disk comprising:

said first area of said plurality of areas comprising:

a first data area formed spirally or concentrically with a center of rotation of said information recording disk, in which information is recorded when said information recording disk is being rotated at said first rotation speed, and a first management area formed spirally or concentrically with said center of rotation of said information recording disk on a side closer to said center of rotation of said information recording disk than said first data area, in which management information associated with writing is recorded when writing is to be performed in said first data area during rotation of said information recording disk at said first rotation speed; and a second area of said plurality of areas comprising:

a second data area formed spirally or concentrically with said center of rotation of said information recording disk, in which information is recorded when said information recording disk is being rotated at a second rotation speed, and a second management area formed spirally or concentrically with said center of rotation of said information recording disk on a side closer to said center of rotation of said information recording disk than said second data area, in which management information associated with writing is recorded when writing is to be performed in said second data area during rotation of said information recording disk at said second rotation speed.

3. A write management method used for information recording in an information recording disk arranged to be rotated at a plurality of rotation speeds such that information is recorded in a first area of a plurality of areas on said information recording disk when said information recording disk is being rotated at a first rotation speed, each area of said plurality of areas being arranged to be accessed when said information recording disk is rotated at a corresponding rotation speed being different from a corresponding rotation speed of any other area of said plurality of areas, said management method comprising:

performing write information management for a first data area only in a first management area; and performing write information management for a second data area only in a second management area, wherein:

said first area of said plurality of areas comprises:

said first data area formed spirally or concentrically with a center of rotation of said information recording disk, in which information is recorded when said information recording disk is being rotated at said first rotation speed, and said first management area formed spirally or concentrically with said center of rotation of said information recording disk on a side closer to said center of rotation of said information recording disk than said first data area, in which management information associated with writing is recorded when writing is to be performed in said first data area during rotation of said information recording disk at said first rotation speed, and a second area of said plurality of areas comprising:

a second data area formed spirally or concentrically with said center of rotation of said information recording disk, in which information is recorded when said information recording disk is being rotated at a second rotation speed, and a second management area formed spirally or concentrically with said center of rotation of said information recording disk on a side closer to said center of rotation of said information recording disk than said second data area, in which management information associated with writing is recorded when writing is to be performed in said second data area during rotation of said information recording disk at said second rotation speed.

4. An information recording disk arranged to be rotated at a plurality of rotation speeds such that information is recorded in a first area of a plurality of areas on said information recording disk when said information recording disk is being rotated at a predetermined rotation speed, each area of said plurality of areas being arranged to be accessed when said information recording disk is rotated at a corresponding rotation speed being different from a corresponding rotation speed of any other area of said plurality of areas, said information recording disk comprising:

said first area of said plurality of areas comprising:

a predetermined data area formed spirally or concentrically with a center of rotation of said information recording disk, in which information is recorded when said information recording disk is being rotated at said predetermined rotation speed, and a predetermined management area formed spirally or concentrically with said center of rotation of said information recording disk on a side farther from said center of rotation of said information recording disk than said predetermined data area, in which management information associated with writing is recorded when writing is to be performed in said predetermined data area during rotation of said information recording disk at said predetermined rotation speed.

5. An information recording disk arranged to be rotated at a plurality of rotation speeds such that information is recorded in a first area of a plurality of areas on said information recording disk when said information recording disk is being rotated at a first rotation speed, each area of said plurality of areas being arranged to be accessed when said information recording disk is rotated at a corresponding rotation speed being different from a corresponding rotation speed of any other area of said plurality of areas, said information recording disk comprising:

said first area of said plurality of areas comprising:

a first data area formed spirally or concentrically with a center of rotation of said information recording disk, in which information is recorded when said information recording disk is being rotated at said first rotation speed, and a first management area formed spirally or concentrically with said center of rotation of said information recording disk on a side farther from said center of rotation of said information recording disk than said first data area, in which management information associated with writing is recorded when writing is to be performed in said first data area during rotation of said information recording disk at said first rotation speed; and a second area of said plurality of areas comprising:

a second data area formed spirally or concentrically with said center of rotation of said information recording disk, in which information is recorded when said information recording disk is being rotated at a second rotation speed, and a second management area formed spirally or concentrically with said center of rotation of said information recording disk on a side farther from said center of rotation of said information recording disk than said second data area, in which management information associated with writing is recorded when writing is to be performed in said second data area during rotation of said information recording disk at said second rotation speed.

6. A write management method used for information recording in an information recording disk arranged to be rotated at a plurality of rotation speeds such that information is recorded in a first area of a plurality of areas on said information recording disk when said information recording disk is being rotated at a first rotation speed, each area of said plurality of areas being arranged to be accessed when said information recording disk is rotated at a corresponding rotation speed being different from a corresponding rotation speed of any other area of said plurality of areas, said management method comprising:

performing write information management for a first data area only in a first management area; and performing write information management for a second data area only in a second management area, wherein:

said first area of said plurality of areas comprises:

said first data area formed spirally or concentrically with a center of rotation of said information recording disk, in which information is recorded when said information recording disk is being rotated at said first rotation speed, and said first management area formed spirally or concentrically with said center of rotation of said information recording disk on a side farther from said center of rotation of said information recording disk than said first data area, in which management information associated with writing is recorded when writing is to be performed in said first data area during rotation of said information recording disk at said first rotation speed, and a second area of said plurality of areas comprising:

a second data area formed spirally or concentrically with said center of rotation of said information recording- disk, in which information is recorded when said information recording disk is being rotated at a second rotation speed, and a second management area formed spirally or concentrically with said center of rotation of said information recording disk on a side farther from to said center of rotation of said information recording disk than said second data area, in which management information associated with writing is recorded when writing is to be performed in said second data area during rotation of said information recording disk at said second rotation speed.

7. An information recording disk arranged to be rotated at a plurality of rotation speeds such that information is recorded in a first area of a plurality of areas on said information recording disk when said information recording disk is being rotated at a predetermined rotation speed, each area of said plurality of areas being arranged to be accessed when said information recording disk is rotated at a corresponding rotation speed being different from a corresponding rotation speed of any other area of said plurality of areas, said information recording disk comprising:

said first area of said plurality of areas comprising:

a predetermined data area formed spirally or concentrically with a center of rotation of said information recording disk, in which information is recorded when said information recording disk is being rotated at said predetermined rotation speed, and a predetermined management area formed spirally or concentrically with said center of rotation of said information recording disk in said predetermined data area, in which management information associated with writing is recorded when writing is to be performed in said predetermined data area during rotation of said information recording disk at said predetermined rotation speed.

8. An information recording disk arranged to be rotated at a plurality of rotation speeds such that information is recorded in a first area of a plurality of areas on said information recording disk when said information recording disk is being rotated at a first rotation speed, each area of said plurality of areas being arranged to be accessed when said information recording disk is rotated at a corresponding rotation speed being different from a corresponding rotation speed of any other area of said plurality of areas, said information recording disk comprising:

said first area of said plurality of areas comprising:

a first data area formed spirally or concentrically with a center of rotation of said information recording disk, in which information is recorded when said information recording disk is being rotated at said first rotation speed, and a first management area formed spirally or concentrically with said center of rotation of said information recording disk in said first data area, in which management information associated with writing is recorded when writing is to be performed in said first data area during rotation of said information recording disk at said first rotation speed; and a second area of said plurality of areas comprising:

a second data area formed spirally or concentrically with said center of rotation of said information recording disk, in which information is recorded when said information recording disk is being rotated at a second rotation speed, and a second management area formed spirally or concentrically with said center of rotation of said information recording disk in said second data area, in which management information associated with writing is recorded when writing is to be performed in said second data area during rotation of said information recording disk at said second rotation speed.

9. A write management method used for information recording in an information recording disk arranged to be rotated at a plurality of rotation speeds such that information is recorded in a first area of a plurality of areas on said information recording disk when said information recording disk is being rotated at a first rotation speed, each area of said plurality of areas being arranged to be accessed when said information recording disk is rotated at a corresponding rotation speed being different from a corresponding rotation speed of any other area of said plurality of areas, said management method comprising:

performing write information management for a first data area only in a first management area; and performing write information management for a second data area only in a second management area, wherein:

said first area of said plurality of areas comprises:

said first data area formed spirally or concentrically with a center of rotation of said information recording disk, in which information is recorded when said information recording disk is being rotated at said first rotation speed, and said first management area formed spirally or concentrically with said center of rotation of said information recording disk in said first data area, in which management information associated with writing is recorded when writing is to be performed in said first data area during rotation of said information recording disk at said first rotation speed, and a second area of said plurality of areas comprising:
  a second data area formed spirally or concentrically with said center of rotation of said information recording disk, in which information is recorded when said information recording disk is being rotated at a second rotation speed, and
  a second management area formed spirally or concentrically with said center of rotation of said information recording disk in said second data area, in which management information associated with writing is recorded when writing is to be performed in said second data area during rotation of said information recording disk at said second rotation speed.

10. An information recording disk arranged to be rotated at a plurality of rotation speeds such that information is recorded in a first area of a plurality of areas on said information recording disk when said information recording disk is being rotated at a first rotation speed, each area of said plurality of areas being arranged to be accessed when said information recording disk is rotated at a corresponding rotation speed being different from a corresponding rotation speed of any other area of said plurality of areas, said information recording disk comprising:

said first area of said plurality of areas comprising:
  a first data area formed spirally or concentrically with a center of rotation of said information recording disk, from which information is read or to which information is written when said information recording disk is being rotated at said first rotation speed, and a first management area formed spirally or concentrically with said center of rotation of said information recording disk, in which management information associated with writing is recorded when writing is to be performed in said first data area during rotation of said information recording disk at said first rotation speed;

a second area of said plurality of areas comprising:
  a second data area formed spirally or concentrically with said center of rotation of said information recording disk, from which information is read out when said information recording disk is being rotated at a second rotation speed; and a third area of said plurality of areas comprising:
  a third data area formed spirally or concentrically with said center of rotation of said information recording disk, in which information is written once or from which said information is read out when said information recording disk is being rotated at a third rotation speed.

11. An information recording disk according to claim 10, wherein defect information associated with said first to said third data areas are recorded in said first management area.

12. An information recording disk according to claim 10, wherein use frequency information associated with any one of said first to said third data areas is recorded in said first management area.

13. An information recording disk according to claim 10, wherein use condition information associated with any one of said first to said third data areas is recorded in said first management area.

14. An information recording disk according to claim 13, wherein said use condition information includes a password.

* * * * *